US012683069B2

(12) United States Patent
Harata et al.

(10) Patent No.: US 12,683,069 B2
(45) Date of Patent: Jul. 14, 2026

(54) COIL DEVICE

(71) Applicant: TDK CORPORATION, Tokyo (JP)

(72) Inventors: Hideaki Harata, Tokyo (JP); Takuma Tanaka, Tokyo (JP); Masaru Kumagai, Tokyo (JP); Tomohiro Furuichi, Tokyo (JP); Satoshi Denda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1086 days.

(21) Appl. No.: 17/704,612

(22) Filed: Mar. 25, 2022

(65) Prior Publication Data

US 2022/0319768 A1 Oct. 6, 2022

(30) Foreign Application Priority Data

Mar. 31, 2021 (JP) ................................ 2021-060994
Aug. 30, 2021 (JP) ................................ 2021-140535

(51) Int. Cl.
*H01F 27/02* (2006.01)
*H01F 27/28* (2006.01)
*H01F 27/32* (2006.01)

(52) U.S. Cl.
CPC ....... *H01F 27/325* (2013.01); *H01F 27/2876* (2013.01)

(58) Field of Classification Search
CPC .................................................... H01F 27/325
USPC ........................................................ 336/96
See application file for complete search history.

(56) References Cited

U.S. PATENT DOCUMENTS

2011/0115594 A1* 5/2011 Yen ....................... H01F 27/325 29/605
2011/0221562 A1* 9/2011 Tsai ..................... H01F 27/325 336/221
2014/0001976 A1* 1/2014 Park ........................ H01F 5/04 315/276
2014/0002224 A1* 1/2014 An ........................... H01F 5/02 336/192
2015/0061809 A1* 3/2015 Hoffmann ................ H01F 5/04 29/605
2015/0170819 A1 6/2015 Yamashima et al.
2015/0287525 A1* 10/2015 Yamada ................ H01F 37/00 336/105

FOREIGN PATENT DOCUMENTS

| | | | |
|---|---|---|---|
| CN | 110634661 | A | 12/2019 |
| JP | S55-6107 | U | 1/1980 |
| JP | S58-4172 | U | 1/1983 |
| JP | H04-79406 | U | 7/1992 |
| JP | H06-196341 | A | 7/1994 |
| JP | H10-055925 | A | 2/1998 |
| JP | H10-125543 | A | 5/1998 |

(Continued)

*Primary Examiner* — Ronald Hinson
(74) *Attorney, Agent, or Firm* — Oliff PLC

(57) ABSTRACT

A coil device including; a bobbin including a winding part wound with a first wire and a second wire around an outer circumference face of the winding part, and flanges and formed at ends of the winding part in an axis direction; and a terminal block formed separately from the bobbin and installed to the bobbin The terminal block is arranged at a position spaced away from the outer circumference face of the winding part in a direction perpendicular to the axis direction of the winding part.

18 Claims, 13 Drawing Sheets

(56) References Cited

FOREIGN PATENT DOCUMENTS

| | | | |
|---|---|---|---|
| JP | H11-67550 | A | 3/1999 |
| JP | 3081351 | U | 11/2001 |
| JP | 2007-080951 | A | 3/2007 |
| JP | 2014-036194 | A | 2/2014 |
| JP | 2016-207811 | A | 12/2016 |
| JP | 2018-067673 | A | 4/2018 |
| JP | 2019-114622 | A | 7/2019 |

* cited by examiner

COIL DEVICE

TECHNICAL FIELD

The present disclosure relates to a coil device.

BACKGROUND

As a coil device used for transformers and the like, for example, coil devices described in Patent Document 1 and Patent Document 2 are known. Patent Document 1 discloses a vertical type coil device in which a winding axis of the coil is perpendicular to a face of a mounting substrate. Patent Document 2 discloses a horizontal type coil device in which a winding axis of the coil is parallel to a surface of the mounting substrate.

In the vertical type coil as device disclosed in Patent Document 1, a height along the winding axis direction tends to be high, and it was difficult to shorten the height. On the other hand, the horizontal type coil device disclosed in Patent Document 2 can solve problems such as mentioned in above, hence the coil device disclosed in Patent Document 2 is advantageous from the point of shortening the height.

However, in the coil device disclosed in Patent document 2, a first terminal block is formed at lower side of a first flange which is formed to the bobbin at one end in axis direction, and a second terminal block is formed at lower side of a second flange which is formed to the bobbin at the other end in axis direction. Thus, the size of the coil device is increased in the axis direction and in a perpendicular direction to the axis direction of the bobbin, hence it was difficult to downsize the col device.

[Patent Document 1] JP Patent Application Laid Open No. 2014-36194

[Patent Document 2] JP Patent Application Laid Open No. 2018-67673

SUMMARY

The present disclosure is achieved in view of such circumstances, and the object is to provide a coil device which can be downsized.

In order to achieve such object, the coil device according to the present disclosure includes;

- a bobbin including a winding part wound with a wire around an outer circumference face of the winding part, and a flange formed at an end of the winding part in an axis direction; and
- a terminal block formed separately from the bobbin and installed to the bobbin; in which
- the terminal block is installed to the bobbin at a position spaced away from the outer circumference face of the winding part in a direction perpendicular to the axis direction of the winding part.

The coil device according to the present disclosure is formed separately from the bobbin, and has the terminal block which is installed to the bobbin. Therefore, when the coil device is being produced, the wire can be wound around the outer circumference face of the winding part while the bobbin is separated from the terminal block. Particularly, in case of winding the wire using an auto-winding machine, such configuration can prevent the terminal block from interfering auto-winding using the auto-winding machine. Also, by forming the terminal block (only) using a high heat resistant resin separately from the bobbin, the coil device having a heat resistance can be produced at a low cost.

Also, in the coil device according to the present disclosure, the terminal block is provided at a position spaced away from the outer circumference face of the winding part in a perpendicular direction to an axis direction of the winding part. Thus, the terminal block can be placed to a lateral side from the winding part, hence a size (length) of the coil device in the axis direction of the winding part can be made smaller compared to a conventional coil device in which a terminal block is formed to an end in axis direction of a winding part. Also, the coil device according to the present disclosure can reduce a size (height) of the coil device in a perpendicular direction to the axis direction of the winding part (that is, a height direction of the coil device) compared to a conventional coil device in which a terminal block is arranged under at a lower side of the flange. Therefore, the coil device according to the present disclosure achieves a compact coil device.

Preferably, the end of the winding part may include ends, and the terminal block may be connected to one of the ends in the axis direction of the winding part and also may be connected to another one of the ends in the axis direction of the winding part, and the terminal block may be provided approximately parallel to the axis direction of the winding part.

By constitution as such, the terminal block can be prevented from protruding out unnecessarily in a perpendicular direction to the axis direction of the winding part, thus the size of the coil device in a perpendicular direction to the axis direction of the winding part can be downsized.

Preferably, the terminal block may have an arm having a first hook part formed in a hook shape at a tip of the arm and protruding out towards the bobbin; and

- the flange may include a flange engaging part which extends in a direction approximately perpendicular to the arm and engages with the first hook part.

By engaging the arm of the terminal block to the flange engaging part of the flange using the first hook part, the terminal block can be installed to the bobbin with a sufficient fixing strength even without using adhesives and the like. Thereby, the coil device can be produced at a lower cost and also it can be produced quickly. Also, the terminal block can be provided at a position spaced away for a length corresponding to the length of the arm from the outer circumference face of the winding part in a perpendicular direction to the axis direction of the winding part. Hence, by changing the length of the arm, the position of the terminal block can be adjusted.

Preferably, a second hook part having a hook shape may be formed at a tip of the flange engaging part, and a lead part of the wire may be pulled out towards the terminal block along a circumference of the arm while the first hook part is engaged with the flange engaging part.

By pulling out the lead part of the wire along the circumference of the arm towards the terminal block, a short length of the lead part can be pulled out from the winding part towards the arm. Thus, unnecessary drawing of the lead part (increasing length of the lead part) is prevented, and a quality of the coil device can be improved. Furthermore, the prevention of the unnecessary drawing of the lead part contributes to reduction of an electric resistance and suppressing of a resonance of the wire. Also, by forming a second hook part to the flange engaging part, the lead part pulled out along the circumference of the arm can be prevented from shifting towards a tip of the flange engaging part.

Preferably, a terminal block fixing part fixed with the terminal block may be formed at an end of the bobbin in an axis direction, in which the terminal block fixing part may include a first step part, the terminal block may include a second step part, and the first step part and the second step part may engage with each other while a first step lower face of the first step part and a second step lower face of the second step part are in contact.

By constituting as such, the first step part and the second step part are fixed against each other, and a position of the terminal block is prevented from shifting against the terminal block fixing part to a normal line direction of each of the first step lower face and the second step lower face. Also, the terminal block can be installed to the terminal block fixing part with a sufficient strength.

Preferably, a terminal block fixing part fixing the terminal block may be formed at an end of the bobbin in an axis direction, in which the terminal block fixing part may include a raised part which protrudes out towards the terminal block, and the terminal block may include a recessed part which engages with the raised part.

By engaging the raised part of the terminal block fixing part and a recessed part of the terminal block, in regards with an extending direction of the terminal block, the position of the terminal block is prevented from shifting against the terminal block fixing part.

Preferably, the flange may be formed along a circumference direction of the winding part, and a lead part of the wire may be passed through a notch formed at the flange.

By constituting as such, the lead part of the wire wound around the winding part can be pulled out through the notch to the outside from the inside of the flange where the winding part is located, thus unnecessary drawing of the lead part can be prevented.

Preferably, the lead part may include lead parts, and one of the lead parts of the wire may be pulled out through the notch towards the terminal block from an outer side of the flange, and another one of the lead parts of the wire may be pulled out towards the terminal block from an inner side of the flange without passing through the notch.

By constituting as such, one of the lead parts of the wire runs at the outer side of the flange, and another one of the lead parts of the wire runs at the inner side of the flange, hence one of the lead parts and another one of the lead parts can be securely insulated.

Preferably, the coil device may further include a cover provided around the terminal block; wherein the wire may include wires;

the terminal block may be provided with a plurality of terminals respectively connected with lead parts of the wires;

the terminals may be arranged in the axis direction of the winding part; and the cover may include, a holding part to hold the terminal block, a base part arranged under the terminals, and a side part standing up from a side edge of the base part.

By holding the terminal block using the holding part, the cover can be installed to the terminal block with a sufficient fixing strength even without using the adhesives and the like, thus the coil device can be produced at a lower cost and also it can be produced quickly. Also, due to the base part and the side part of the cover, the terminal installed to the terminal block is protected from exterior force and so on, and also the terminal and the core can be securely insulated due to the base part and the side part.

Preferably, the axis direction of the winding part may be approximately parallel to a mounting surface.

By constituting as such, a height of the coil device can be lowered, hence a low-height coil device can be attained.

Preferably, the coil device may further include a case housing the bobbin, wherein the case may be filled with a potting resin, and at least one through hole may be formed on an outer circumference face of the winding part.

By constituting as such, heat generated in the bobbin and the like can be dissipated to outside via the case and the potting resin, thus the coil device can be cooled down efficiently. Also, by forming the thorough hole to the bobbin, the potting resin can flow in and out of the bobbin via the thorough hole, thus the case can be fully filled with the potting resin.

DETAILED DESCRIPTION

Hereinbelow, the present disclosure is described based on embodiments shown in the figures.

First Embodiment

Figure 1:
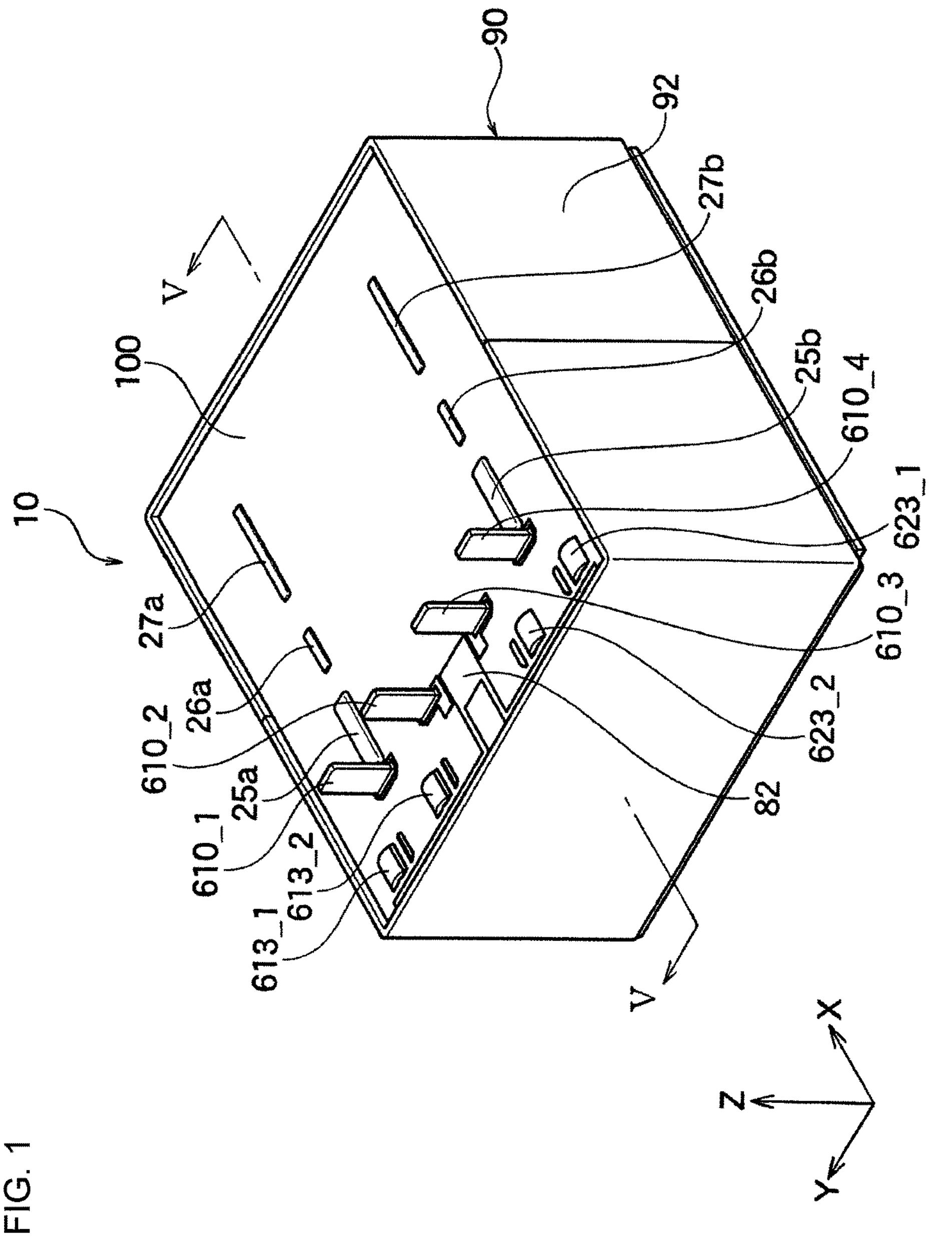
FIG. 1 is a perspective view of a coil device according to a first embodiment of the present disclosure.

A coil device according to the present embodiment shown in FIG. 1 functions, for example, as a transformer, and it may for example be used for a power supply of EV (Electric vehicle), PHV (Plug-in Hybrid Vehicle), an on-board charger for commuter vehicle, or a domestic or industrial electronic devices; and a power supply for computer device. Hereinbelow, a detailed configuration of the coil device 10 is described. Note that, in below, a Z-axis positive direction is considered upper direction, and a negative Z axis direction is considered a lower direction. Also, a direction towards a center of the coil device 10 is considered inside or inner side, a direction away from the center of the coil device 10 is considered outside or outer side.

Figure 3:
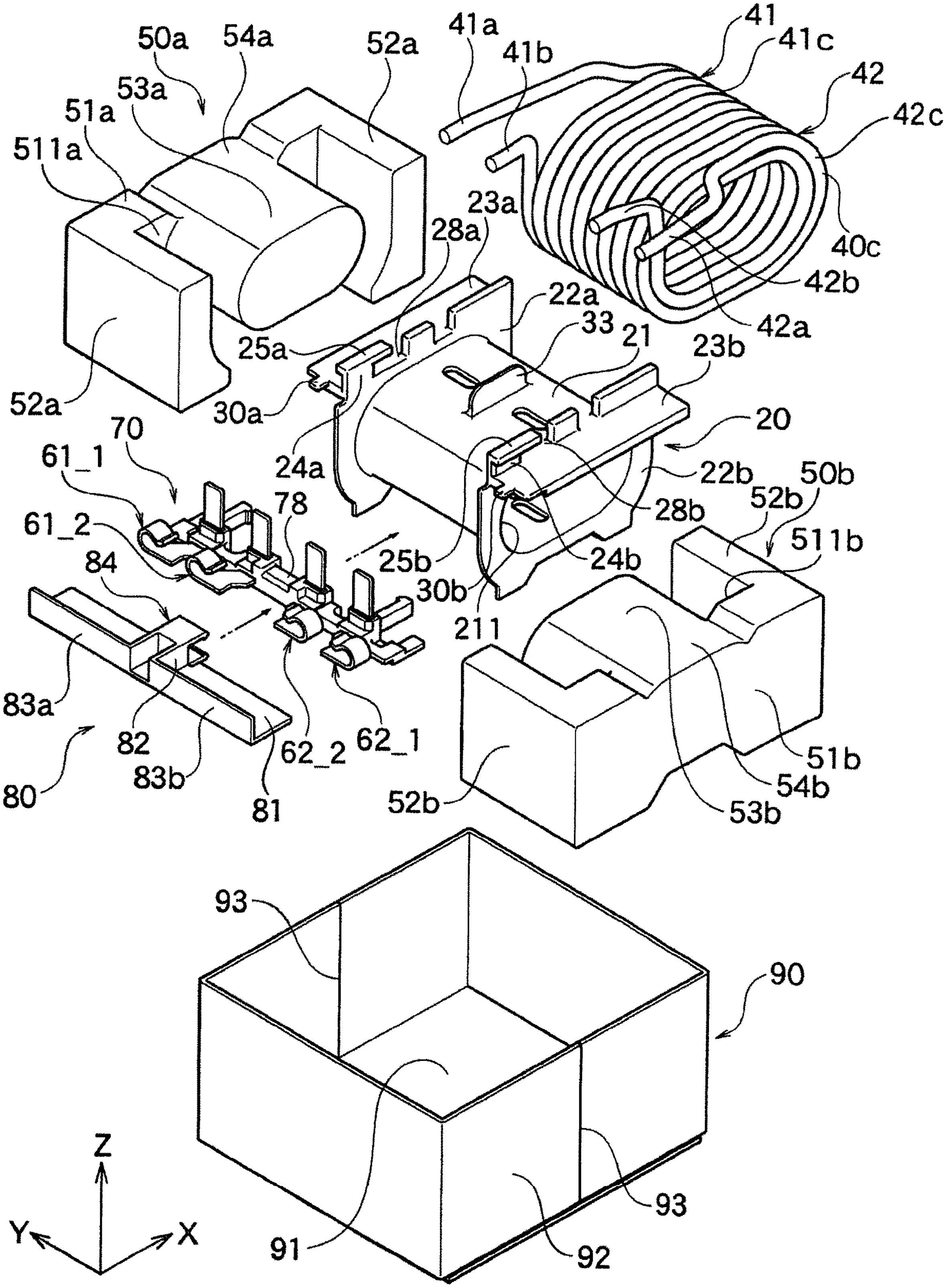
FIG. 3 is an exploded perspective view of the coil device shown in FIG. 1.

As shown in FIG. 3, the coil device 10 includes a bobbin 20, a first coil part 41 and a second coil part 42, a core 50*a* and a core 50*b*, first terminals 61_1 and 61_2, second terminals 62_1 and 61_2, a terminal block 10, a cover 80, and a case 90. The coil device 10 is a horizontal type coil device of which a coil axis of the first coil part 41 and a coil axis of the second coil 42 are parallel to a face of a mounting substrate (not shown in the figure). Note that, the mounting substrate is provided to upper side (a Z-axis positive direction) of the coil device 10 shown in FIG. 1, and the upper side of the coil device 10 is a mounting surface to which the mounting substrate is mounted.

The case 90 is made of metals and the like having an excellent coolability such as aluminum, and the case 90 includes a case base part 91 and a case side part 92. The upper side of the case 90 is opened, and the bobbin 20 and so on can be placed in there from an opened part formed at the upper side of the case 90. The case base part 91 is approximately rectangular parallelepiped shape and constitutes a bottom face of the case 90. The case side part 92 is roughly a square tube shape and the case side part 92 is formed along an outer edge of the case base part 91.

Further specifically, the case side part 92 extends upwards from each of four corner edges which constitute the outer edge of the case base part 91. The case 90 is formed by bend molding a metal plate and the like, and the case side part 92 has a connecting part 93 which is a face where bended portions are connected. Note that, the connecting part 93 may be sealed in a liquid-tight manner by using adhesives and the like to the connecting part 93.

In a housing space formed by the case base part 91 and the case side part 92, the bobbin 20 and so on can be placed inside, and also as shown in FIG. 1, the housing space can be filled with a potting resin 100. As the potting resin 100, a silicone resin, a urethane resin, an epoxy resin, and the like may be mentioned. The case 90 is filled with the potting resin 100 all the way up to the opened part, and the bobbin 20, the first terminal 61_1, the cover 80, and so on may be partially exposed from an upper face of the cured potting resin 100.

In the present embodiment, heat generated in the bobbin 20 and so on can be dissipated through the case 90 and the potting resin 100, thus the coil device 10 can be cooled efficiently.

As shown in FIG. 3, the first coil part 41 is formed by winding a first wire 41*c* to the outer circumference of the winding part 21 of the bobbin 20. Also, the second coil part 42 is formed by winding a second wire 42*c* to an outer circumference of the winding part 21 of the bobbin 20. The first wire 41*c* and the second wire 42*c* are wound around the winding part 21 using for example an auto-winding machine.

The first coil part 41 is formed in two layers on the winding part 21 to the direction which is perpendicular to the winding axis (that is, it is formed along a radial direction); and the second coil part 42 is formed in two layers on the winding part 21 to the direction which is perpendicular to the winding axis (that is, it is formed along a radial direction). Note that, the winding axis of the first coil part 41 and the winding axis of the second coil part 42 are about the same, and the winding axes of these correspond to Y-axis direction.

The first coil part 41 is provided to the winding part 21 towards one side of the Y-axis direction (Y-axis positive direction), and the second coil part 42 is provided to the winding part 21 towards the other side of the Y-axis direction (Y-axis negative direction). Either one of the first coil part 41 and the second coil part 42 constitutes a primary coil, and the other one constitutes a secondary coil. The positions of the primary coil and the secondary coil on the winding part 21 may be one side or the other side in the Y-axis direction of the winding part 21.

The first wire 41*c* and the second wire 42*c* are each constituted by an insulator coated wire, and for example these may be constituted by conductive wires such as a copper wire and the like. The first wire 41*c* and the second wire 42*c* may be each constituted by a single wire or by a stranded wire. The first wire 41*c* and the second wire 42*c* may each have a wire size (diameter) of, for example, 1.0 to 3.0 mm. The first wire 41*c* and the second wire 42*c* may have the same or different wire sizes. For example, among the first wire 41*c* and the second wire 42*c*, the wire to which a larger current flow may have a larger wire size than the other wire.

At one end of the first coil part 41, a lead part 41*a* is formed; and at the other end of the first coil part 41, a lead part 41*b* is formed. For example, the lead part 41*a* is pulled out from the second layer of the first coil part 41, and the lead part 41*b* is pulled out from the first layer of the first coil part 41.

Also, at one end of the second coil part 42, a lead part 42*a* is formed; and at the other end of the second coil 42, a lead part 42*b* is formed. For example, the lead part 42*a* is pulled out from the second layer of the second coil part 42, and the lead part 42*b* is pulled out from the first layer of the second coil part 42.

The core 50*a* and the core 50*b* are cores of so-called E-shaped core, and these cores are installed to the bobbin 20. The materials of the core 50*a* and the core 50*b* are not particularly limited, and the materials may be metals, ferrites, and the like. The core 50*a* and the core 50*b* have the same shapes. The core 50*a* includes a base part 51*a*, a pair of outer leg parts 52*a*, and a middle leg part 53*a*. The core 50*b* includes a base part 51*b*, a pair of outer leg parts 52*b*, and a middle leg part 53*b*. In below, the configuration of the core 50*a* is described, and the same applies to the core 50*b*. Thus, unless mentioned otherwise, the configuration of the core 50*b* is not described.

Figure 4A:
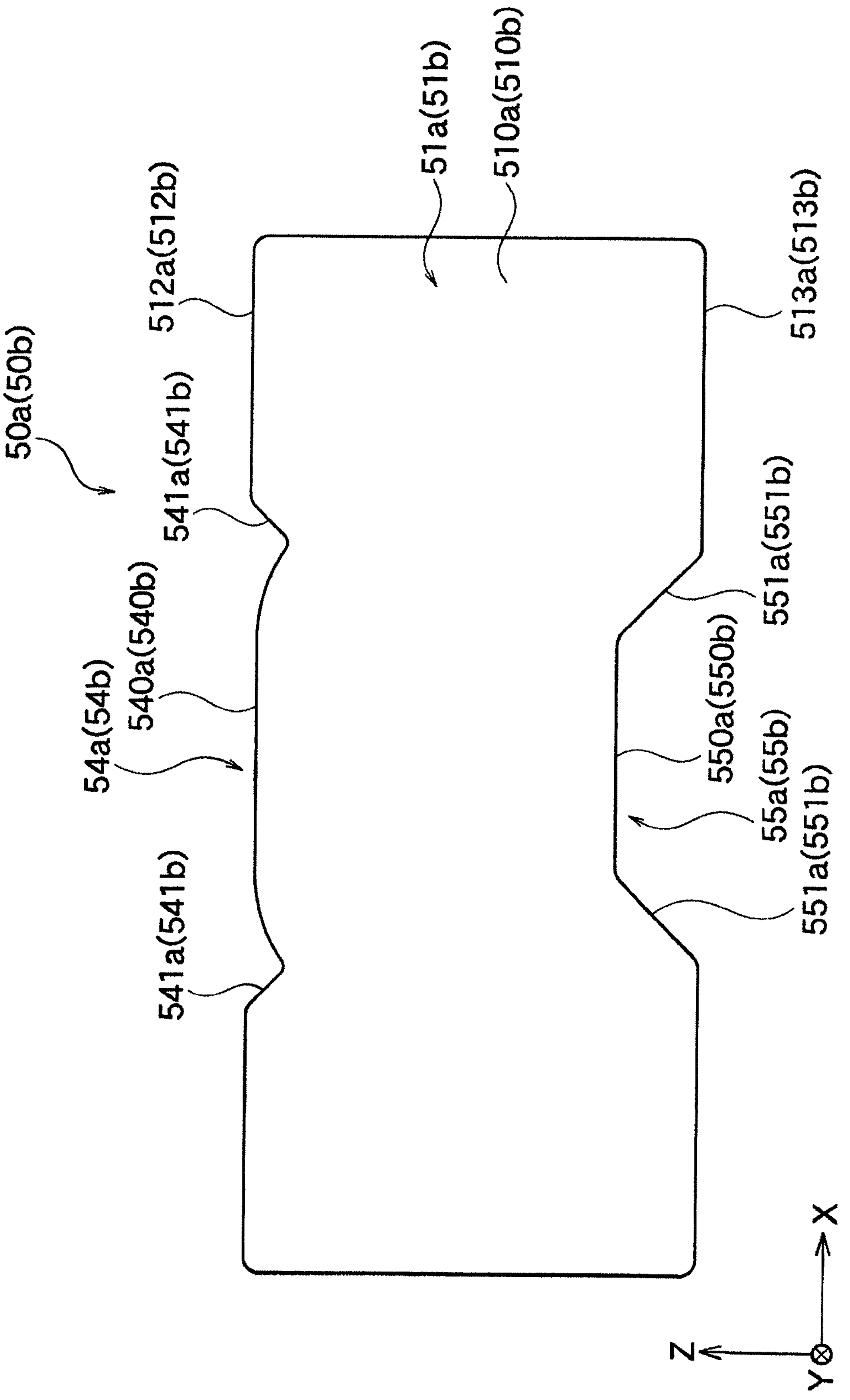
FIG. 4A is a side view of a base part of a core shown in FIG. 3 looking from outside in Y-axis direction.
Figure 4B:
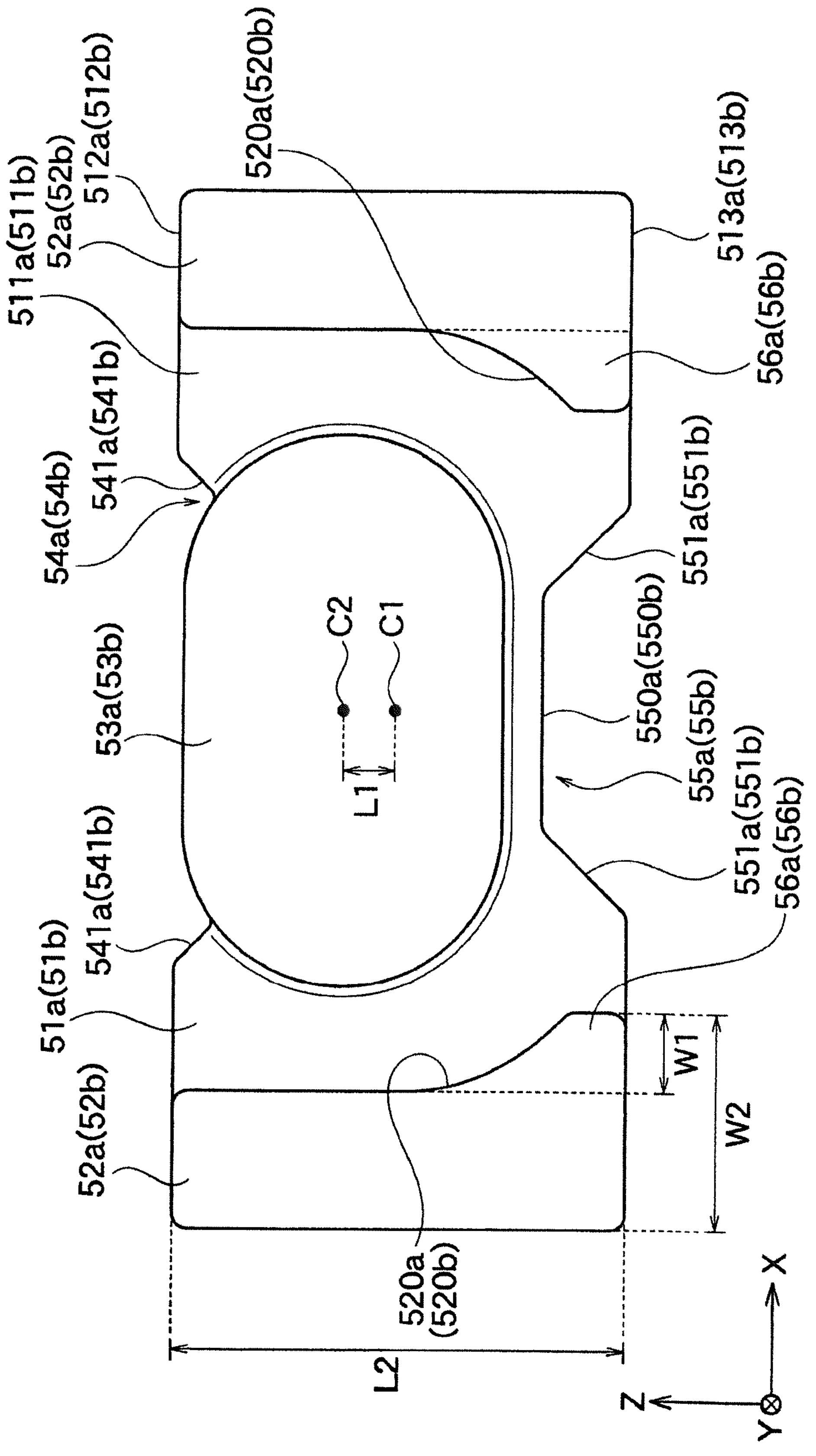
FIG. 4B is a side view of a middle leg part and an outer leg part of the core shown in FIG. 3.

The base part 51*a* has a predetermined thickness in the Y-axis direction, and as shown in FIG. 4A and FIG. 4B, the base part 51*a* has predetermined lengths in X-axis direction and Z-axis direction. In below, the face at outer side of the base part 51*a* in the Y-axis direction is an outer face 510*a*, the face at inner side of the base part 51*a* in the Y-axis direction is an inner face 511*a*, the face on the upper side of the base part 51*a* is an upper face 512*a*, and the face on the lower side of the base part 51*a* is a lower face 513*a*. Also, the face at outer side of the base part 51*b* in the Y-axis direction is an outer face 510*b*, the face at inner side of the base part 51*b* in the Y-axis direction is an inner face 511*b*, the face on the upper side of the base part 51*b* is an upper face 512*b*, and the face on the lower side of the base part 51*b* is a lower face 513*b*.

The upper face 512*a* and the lower face 513*a* are faces which are perpendicular to the outer face 510*a* and the inner face 511*a*. The upper face 512*b* and the lower face 513*b* are faces which are perpendicular to the outer face 510*b* and the inner face 511*b*.

In the present embodiment, at the upper face 512*a* of the base part 51*a*, an upper side recessed part 54*a* which is recessed at a position of the middle leg part 53*a* is formed.

The upper side recessed part 54*a* is formed approximately at a center part of the base part 51*a*, and the upper side recessed part 54*a* has predetermined widths in the X-axis direction and the Y-axis direction. The width of the upper side recessed part 54*a* in the X-axis direction is roughly the same as the width of the middle leg part 53*a* in the X-axis direction. The width of the upper side recessed part 54*a* in the Y-axis direction is roughly the same as the thickness of the base part 51*a* in the Y-axis direction (see FIG. 3).

The upper side recessed part 54*a* is recessed in a predetermined depth from the upper face 512*a* towards the lower side, and the upper side bottom face 540*a* which is a bottom face of the upper side recessed face 54*a* is formed so that the position of the height of the upper side bottom face 540*a* is about the same as the upper portion of the outer circumference face of the middle leg part 53*a*. The upper side bottom face 540*a* is a face which is curved upwards, the upper side bottom face 540*a* is curved about the same as the curve of the upper portion of the outer circumference face of the middle leg part 53*a*. Thus, the upper side bottom face 540*a* is smoothly connected in a continuous manner to the upper portion of the outer circumference face of the middle leg part 53*a* along the Y-axis direction (see FIG. 3) such that the upper side bottom face 540*a* and the upper portion of the outer circumference face of the middle leg part 53*a* have the same heights.

At an inner wall face of the upper side recessed part 54*a* (the face which stands up from both sides of the upper side bottom face 540*a* in the X-axis direction), an upper side taper face 541*a* is formed. The upper side taper face 541*a* is slanted in a predetermined angle, and the upper side taper face 541*a* connects the upper face 512*a* and the upper side bottom face 540*a*.

At the lower face 513*a* of the base part 51*a*, a lower side recessed part 55*a* is formed which is recessed at the position of the middle leg part 53*a*. The lower side recessed part 55*a* is formed approximately at a center part of base part 51*a* in the X-axis direction, and the lower side recessed part 55*a* has predetermined widths in the X-axis direction and the Y-axis direction. The width of the lower side recessed part 55*a* in X-axis direction is smaller than the width of the middle leg part 53*a* in the X-axis direction, and the width of the lower side recessed part 55*a* in X-axis direction is approximately the same as the widths of the recessed bottom parts 37*a* and 37*b* of the bobbin 20 in the X-axis direction (see FIG. 6). The width of the lower side recessed part 55*a* in the Y-axis direction is about the same as the thickness of the base part 51*a* in the Y-axis direction.

As shown in FIG. 4B, the lower side recessed part 55*a* is recessed in a predetermined depth from the lower face 513*a* towards upper side, and the depth of the lower side recessed part 55*a* is larger than the depth of the upper side recessed part 54*a*. The lower side bottom face 550*a* which is a bottom face of the lower side recessed part 55*a* is formed to the lower side by taking a predetermined distance from a lower portion of the outer circumference of the middle leg part 53*a*. The lower side bottom face 550*a* is formed approximately in a flat face, and a step is formed between the lower side bottom face 550*a* and the lower portion of the outer circumference face of the middle leg part 53*a*.

At the inner wall face of the lower side recessed part 55*a* (the face where the lower side bottom face 550*a* stands upwards from both lateral sides in the X-axis direction), the lower side taper face 551*a* is formed. The lower side taper face 551*a* is slanted in a predetermined angle, and connects between the lower face 513*a* and the lower side bottom face 550*a*. The shape of the lower side recessed part 55*a* roughly matches with the shapes of the recessed bottom parts 37*a* and 37*b* (see FIG. 6).

In the present embodiment, as shown in FIG. 3, the inside of the case 90 is filled with the potting resin 100, and a resin layer made of the potting resin 100 is formed around the cores 50*a* and 50*b*. In such case, the upper side recessed part 54*a* and the lower side recessed part 55*a* are filled with the potting resin 100, thus the potting resin 100 and the cores 50*a* and 50*b* have a sufficient contacting area. Therefore, heat generated in the cores 50*a* and 50*b* can be sufficiently dissipated via the potting resin 100.

Also, the upper side recessed part 54*a* has an upper side taper face 541*a* and the lower side recessed part 55*a* has the lower side taper face 551*a*, thus a surface area of an inner wall face of each of the upper side recessed part 54*a* and the lower side recessed part 55*a* is increased. Hence, a contacting area between the potting resin 100 and the upper side recessed part 54*a* and a contacting area between the potting resin 100 and the lower side recessed part 55*a* can be increased.

Also, while the case is being filled with the potting resin 100, for example, the potting resin 100 flows from the inside (or outside) to the outside (or inside) in the Y-axis direction of the base part 51*a*, and the potting resin 100 runs inside the upper side recessed part 54*a* and the lower side recessed part 55*a* (that is, the upper side recessed part 54*a* and the lower side recessed part 55*a* function as a flow path of the potting resin 100), thereby the case 90 is fully filled with the potting resin 100.

The middle leg part 53*a* is provided between the pair of the outer leg parts 52*a*, and it is connected to the inner face 511*a* of the base part 51*a*. The middle leg part 53*a* extends along the Y-axis direction of the inner face 511*a* in a predetermined length, and the middle leg part 53*a* is provided inside a thorough hole 211 formed to the winding part 21 of the bobbin 20. The middle leg part 53*a* of the core 50*a* and the middle leg part 53*b* of the core 50*b* are provided in the through hole 211, and a tip of the middle leg part 53*a* and a tip of the middle leg part 53*b* face against each other in the through hole 211. Note that, a gap along the Y-axis direction may be formed between the tip of the middle leg part 53*a* and the tip of the middle leg part 53*b*.

As shown in FIG. 4B, the middle leg part 53*a* is not formed at a center part of the inner face 511*a* of the base part 51*a*, and it is formed at a position which is slightly shifted to the upper side (one side in the Z-axis direction) from a center C1 of the inner face 511*a*. A distance L1 which is between a center C2 of the middle leg part 53*a* and the center C1 of the inner face 511*a* of the base part 51*a* (that is, a width which is shifted to the Z-axis direction of the center C2 of the middle leg part 53*a* from the center C1 of the inner face 511) may be determined based on a length L2 of the base part 51*a* (the outer leg part 52*a*) along the Z-axis direction. A ratio of L1 to L2 may preferably be within a range of $0<L1/L2<1/4$, and more preferably $0<L1/L2<1/6$. In the present embodiment, as described in below, mainly, in order to secure a sufficient space for forming a thicker portion 56*a* to the outer leg part 52*a* at a lower side of the inner face 511*a*, the middle leg part 53*a* is provided at a position shifted upwards from the center C1 of the inner face 511*a*.

The upper portion of the outer circumference face of the middle leg part 53*a* is provided at a position close to the upper face 512*a* of the base part 51*a*, and it is provided lower than the upper face 512*a*. A shape of the upper portion of the outer circumference of the middle leg part 53*a* roughly matches with the shape of the upper side bottom face 540*a* of the base part 51*a* (see FIG. 4). The lower portion of the outer circumference face of the middle leg part 53*a* is provided at a position close to the lower side bottom face 550*a* of the lower side recessed part 55*a*, and it is provided at upper position than the lower side bottom face 550*a*. That is, in regards with the Z-axis direction, the middle leg part 53*a* is positioned between the upper face 512*a* and the lower side recessed part 55*a* (the lower side bottom face 550*a*).

As shown in FIG. 3, the pair of the outer leg parts 52*a* is provided by taking a predetermined space along the X-axis direction, and the pair of the outer leg parts 52*a* connects to the inner face 511*a* of the base part 51*a*. One of the pair of outer leg parts 52*a* is provided at one end of the inner face 511*a* in the X-axis direction; and the other of the pair of outer leg parts 52*a* is provided at the other end the inner face 511*a* in the X-axis direction.

The pair of outer leg parts 52*a* extends in a predetermined length along the Y-axis direction from the inner face 511*a*, and the pair of outer leg parts 52*a* is provided to the outer side of the winding part 21 of the bobbin 20.

As shown in FIG. 4B, at each end in the Z-axis direction of the pair of outer leg parts 52*a*, the thicker part 56*a* is formed. The thicker part 56*a* is formed at a lower end of the outer leg part 52*a* (that is an opposite side in Z-axis direction of the above-mentioned shifted position (upper side) of the middle leg part 53*a*).

The thicker portion 56*a* protrudes towards the inner side of the X-axis direction (towards the side where the center C1 of the inner face 511*a* of the base part 51*a* is positioned), and the thicker part 56*a* is formed so that it is thicker in the X-axis direction. By forming the thicker part 56*a* to the outer leg part 52*a*, a sufficient cross section area of the outer leg part 52*a* can be ensured, and the coil device 10 having an excellent inductance property can be obtained.

Also, the cross-section area of the outer leg part 52*a* increases for the amount of the cross-section area of the thicker part 56*a*, thus even in case the lengths in the Z-axis direction and the Y-axis direction of the outer leg part 52*a* are shortened (that is, in case the volume of the core 50*a* is reduced), a necessary cross section can be sufficiently secured, and core 50*a* can be downsized and also the coil device 10 can also be downsized. Also, by downsizing the core 50*a*, for example, when the potting resin 100 fills the surrounding of the core 50*a*, the flow of the potting resin 100 entering around the core 50*a* can be facilitated.

A width W1 of the thicker portion 56*a* along the X-axis direction becomes wider towards the lower direction. A ratio of the width W1 along the X-axis direction of the thicker portion 56*a* to a maximum width W2 along the X-axis direction of the base part 51*a* may preferably be within a range of $0<W1/W2<\frac{1}{2}$. As the ratio W1/W2 is within the above-mentioned range, a sufficient volume of the thicker portion 56*a* can be ensured, and also a sufficient volume of the area which is not formed with the thicker portion 56*a* can also be ensured, thus the inductance property of the coil device 10 can be improved.

Figure 5:
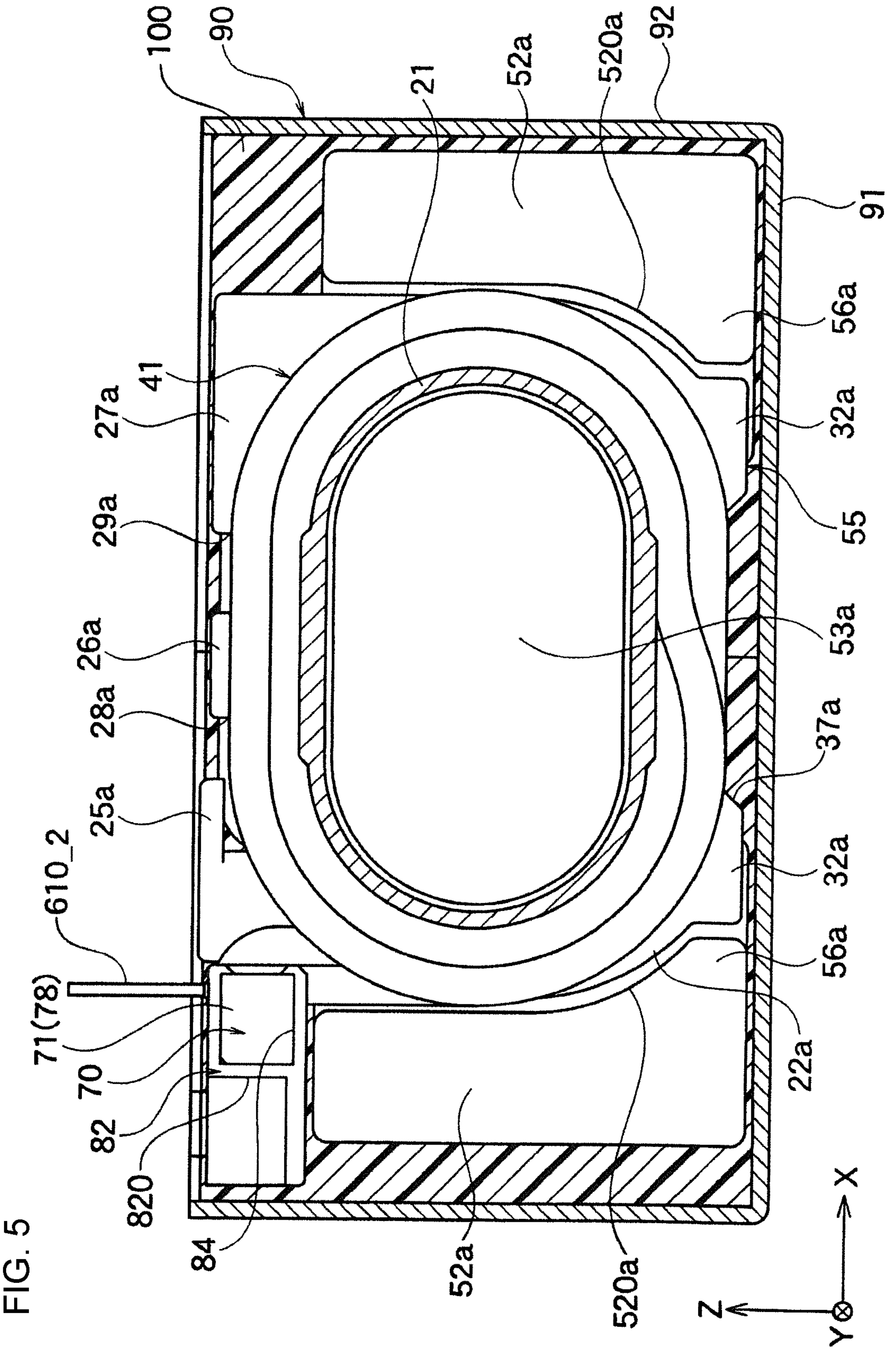
FIG. 5 is a cross section of the coil device shown in FIG. 1 along V-V line.

An outer leg inner surface 520*a* of the outer leg part 52*a* is curved in the X-axis direction towards the lower end of the outer leg part 52*a*. That is, since the thicker portion 56*a* is formed to the outer leg part 52*a*, the outer leg inner surface 520*a* is curved at the position of the thicker portion 56*a* and at the side where the center C1 of the inner face 511*a* of the base part 51*a* is positioned. The curved portion of the outer leg inner surface 520*a* roughly matches with the curve of the outer circumference of the middle leg part 53*a*. Also, as shown in FIG. 5, the curved portion of the outer leg inner surface 520*a* roughly matches with the curve of a periphery of the flange 22*a* (the flange main part 220*a*) of the bobbin 20. Note that, the outer surface of the outer leg mart 52*a*, which is at the opposite position in the X-axis direction to the outer leg inner surface 520*a*, extends along the Z-axis direction, and the shape of the outer leg inner surface 520*a* is different from the shape of the outer surface of the outer leg part 52*a*.

As shown in FIG. 4B, in the present embodiment, the cross-section area S1 of the middle leg part 53*a* is approximately the same as the sum of one cross section area S2 and the other cross section area S3 of the pair of the outer leg parts 52*a*. In the present embodiment, as a result of forming the thicker portion 56*a* to the outer leg part 52*a*, the cross-section area of the outer leg part 52*a* increases, hence even when the overall size of the outer leg part 52*a* is decreased, the sum of the pair of the outer leg parts 52*a* (S2+S3) may be approximately the same as the cross-section S1 of the middle leg part 53*a*.

By forming the thicker portion 56*a* to the outer leg part 52*a* and also by constituting as such, a magnetic saturation of a magnetic flux passing through the middle leg part 53*a* and the pair of the outer leg parts 52*a* can be effectively prevented, and the inductance property of the coil device 10 can be enhanced.

The bobbin 20 may be constituted for example by plastics such as PPS, PET, PBT, LCP, and the like, or other insulating materials (preferably by the material having a heat resistance). As shown in FIG. 3, the bobbin 20 includes the winding part 21, the flanges 22*a* and 22*b*, and the terminal block fixing parts 23*a* and 23*b*.

At the outer circumference face of the winding part 21, the first wire 41*c* and the second wire 42*c* are wound, and the first coil part 41 and the second coil part 42 are formed. The first coil part 41 is provided at one side of the winding part 21 in the Y-axis direction and also it is provided between the flange 22*a* and projection parts 33 and 34 which are described in below.

One end of the first coil part 41 in the winding axis direction is provided at the position adjacent to the flange 22*a*, and the other end of the first coil part 41 in the winding axis direction is provided at a position adjacent to the projection parts 33 and 34. Also, one end of the second coil part 42 in the winding axis direction is provided at a position adjacent to the flange 22*b*, and the other end of the second coil part 42 in the winding axis direction is provided adjacent to the projection parts 33 and 34.

The winding part 21 is a tubular body having an oval shape, and the axis direction of the winding part 21 coincides with the Y-axis direction. At the inner side of the winding part 21, a through hole 211 is formed, and the middle leg parts 53*a* and 53*b* of the cores 50*a* and 50*b* can be placed inside the through hole 211. As mentioned in above, the coil device 10 of the present embodiment is a horizontal type coil device 10, hence the axis direction of the winding part 21 is approximately parallel to the mounting face of the coil device 10 or the mounting face of the mounting substrate (not shown in the figures). Therefore, the height of the coil device 10 can be suppressed, and the height of the coil device 10 can be shortened. As a result, the coil device 10 with a low height can be attained.

A transverse cross section of the winding part 21 (the cross-section shape of the face parallel to the X-Z plane) has approximately an oval shape (see FIG. 5). In the transverse cross section of the winding part 21, a face of a longitudinal side of the winding part 21 (that is, the upper portion and the lower portion of the outer circumference face of the winding part 21) is approximately a flat face, and a face on a shorter side of the winding part 21 (that is, the lateral side portion of the outer circumference face of the winding coil 21) is a curved face. Note that, the face of the longitudinal side of the winding part 21 may be curved, however in such case preferably the degree of curve may be smaller than the degree of curve of the face of the short side of the winding part 21.

Figure 6:
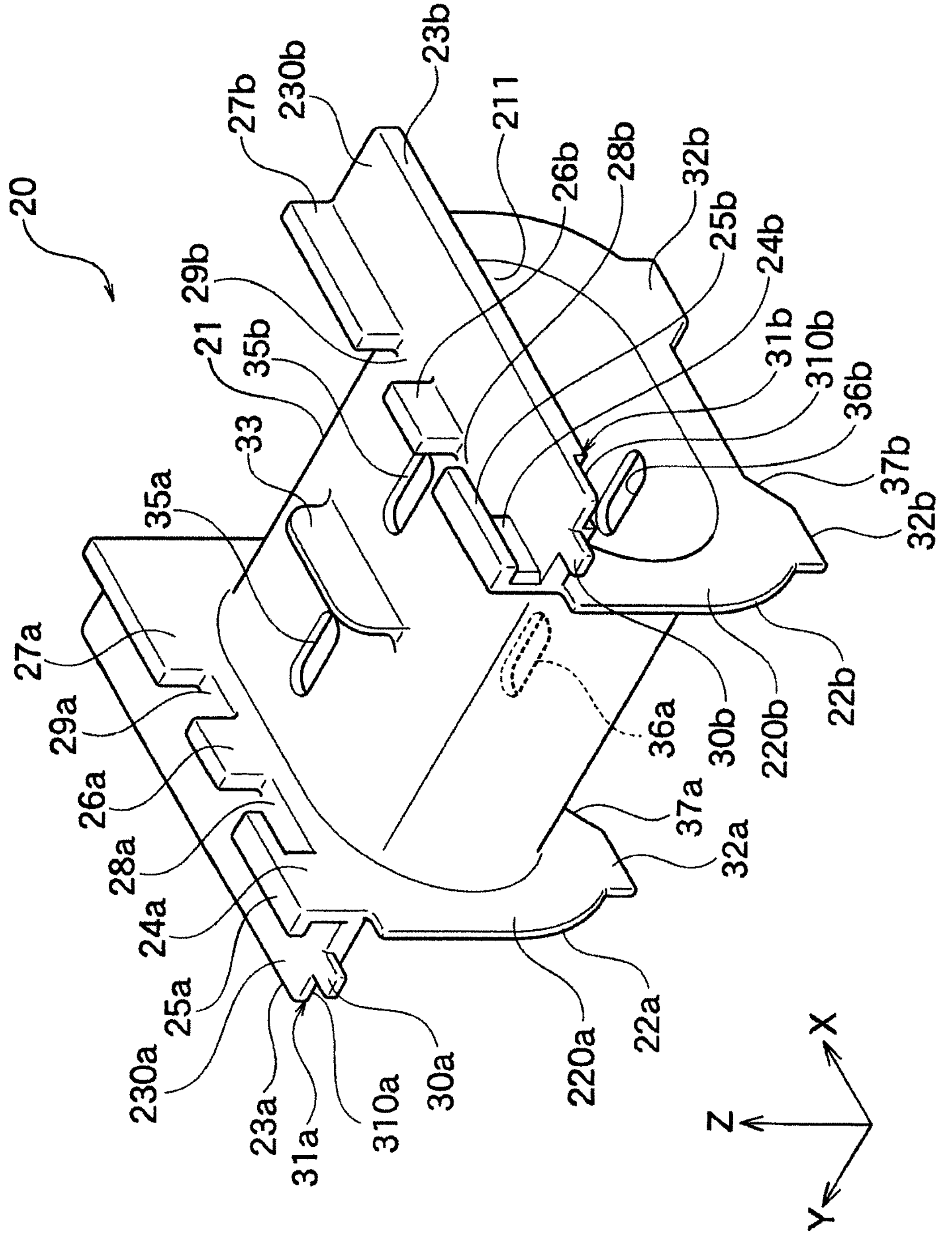
FIG. 6 is a perspective view of a bobbin shown in FIG. 3.

As shown in FIG. 6, on the upper portion of the outer circumference face of the winding part 21, through holes 35*a* and 35*b* are formed by taking a predetermined space between each other in the Y-axis direction. The through holes 35*a* and 35*b* are position at the center of the winding part 21 in the X-axis direction. The through hole 35*a* is positioned towards one side of the Y-axis direction than the projection part 33 (that is, the position where the first coil part 41 is provided); and in regards with the Y-axis direction, it is provided between the flange 22*a* and the projection part 33. The through hole 35*b* is positioned towards the other side of the Y-axis direction than the projection part 33 (that is, the position where the second coil part 42 is provided), and in regards with the Y-axis direction, it is provided between the flange 22*b* and the projection part 33. The through holes 35*a* and 35*b* have the same shapes, and both are oval-shaped opening having a longitudinal side in the Y-axis direction.

At the lower portion of the outer circumference face of the winding part 21, the through holes 36*a* and 36*b* are formed taking a predetermined space between each other in the Y-axis direction. The through holes 36*a* and 36*b* are positioned at the center part of the winding part 21 in the X-axis direction. The through hole 36*a* is positioned towards one side of the Y-axis direction than the projection part 34 (see FIG. 7), and in regards with the Y-axis direction (that is, the position where the first coil part 41 is provided), it is positioned between the flange 22*a* and the projection part 34. The through hole 36*b* is positioned towards the other side of the Y-axis direction than the projection part 34 (that is, the position where the second coil part 42 is provided), and in regards with the Y-axis direction, it is provided between the flange 22*b* and the projection part 34. The through holes 36*a* and 36*b* are the same shapes, and both are oval-shaped opening having a longitudinal side in the Y-axis direction. In regards with the Z-axis direction, the position of the through hole 36*b* coincides with the position of through hole 35*b*.

By forming the through holes 35*a*, 35*b*, 36*a*, and 36*b* to the winding part 21, the potting resin 100 can flow in and out of the bobbin 20 (the winding part 21) via these through holes (see FIG. 1), and the potting resin 100 can be fully filled with the potting resin 100.

The flange 22*a* is formed at one end of the winding part 21 in the axis direction, and the flange 22*b* is formed at the other end of the winding part 21 in the axis direction. The flange 22*a* and the flange 22*b* have the same shapes. The flange 22*a* has a flange main part 220*a* at one end of the winding part 21 in the Y-axis direction, and the flange main part 220*a* is formed along the outer circumference face of the winding part 21 and it extends in a circumference direction. The flange 22*b* has a flange main part 220*b* at the other end of the winding part 21 in the Y-axis direction and the flange main part 220*b* is formed along the outer circumference face of the winding part 21 and it extends in a circumference direction. The flange main part 220*a* has a board shape with a predetermined thickness in the Y-axis direction, and it extends out of the winding part 21 in a radial direction. The flange main part 220*b* has a board shape with a predetermined thickness in the Y-axis direction, and it extends out of the winding part 21 in a radial direction.

At the lower side of the flange main part 220*a*, a pair of mounting parts 32*a* is formed (see FIG. 5). One of the mounting parts 32*a* is formed at one side of the flange main part 220*a* in the X-axis direction, and the other one of the mounting parts 32*a* is formed at the other side of the flange main part 220*a* in the X-axis direction. One of the mounting parts 32*a* and the other one of the mounting parts 32*a* are provided by taking a predetermined distance between each other in the X-axis direction. The pair of the mounting parts 32*a* extends from the flange main part 220*a* approximately parallel to the XZ plane. The pair of mounting parts 32*a* has a bottom face which is approximately a flat surface. The pair of mounting parts 32*a* is mounted on the case base part 91 of the case 90.

At the lower side of the flange main part 220*b*, a pair of mounting parts 32*b* is formed. The configuration and the function of the pair of the mounting parts 32*b* are omitted from explaining here as these are the same as the configuration and the function of the pair of mounting parts 32*a*. The winding part 21 and so on of the bobbin 20 can be supported by the pair of mounting parts 32*a* and the pair of mounting parts 32*b*.

A recessed base part 37*a* is formed between each of the pair of mounting parts 32*a*, and a recessed base part 37*b* is formed between each of the pair of mounting parts 32*b*. The recessed base parts 37*a* and 37*b* are recessed to the upper side from the positions of the base faces of the mounting parts 32*a* and 32*b*. The base parts of the recessed base parts 37*a* and 37*b* constitute part of the outer circumference faces of the flange main parts 220*a* and 220*b*, and part of the inner wall faces of the recessed base parts 37*a* and 37*b* are angled in a taper form. By forming the recessed base parts 37*a* and 37*b* to the flange main parts 220*a* and 220*b*, and when the case 90 is being filled with the potting resin 100 (see FIG. 1), for example, the potting resin 100 flows inside of the recessed base parts 37*a* and 37*b* from the inner side (or outer side) to the outer side (or inner side) of the recessed base parts 37*a* and 37*b* in the Y-axis direction (that is, the recessed base parts 37*a* and 37*b* function as a flow path of the potting resin 100). Hence, even the lower side of the bobbin 20 can be filled with the potting resin 100.

At the upper side of the flange main part 220*a*, a flange engaging part 24*a* is formed. The flange engaging part 24*a* is integrally connected to the upper side of the flange main part 220*a*, and it extends from the flange engaging part 220*a* approximately parallel along the XZ plane. That is, the flange engaging part 24*a* has a shape which extends the flange main part 220*a* to the upper side, and the flange engaging part 24*a* constitutes part of the flange main part 220*a*. The flange engaging part 24*a* is formed at the upper end towards the X-axis negative direction of the flange main part 220*a*, and the flange engaging part 24*a* protrudes to the upper side than a fixing main part 230*a* of the terminal block fixing part 23*a*.

The flange engaging part 24*a* has a predetermined thickness in the Y-axis direction, and also has a face which is approximately parallel to the XZ plane. Also, the flange engaging part 24*a* extends in a direction which is approximately perpendicular to a longitudinal direction (X-axis direction) of an arm 72*a* of the terminal block 70 (see FIG. 8). A terminal block hook 73*a* (see FIG. 8) formed to a tip of the arm 72*a* can engage with the flange engaging part 24*a*.

A bobbin hook 25*a* having a hook shape is formed to a tip (upper tip) of the flange engaging part 24*a*. The bobbin hook 25*a* is configured so that it extends inwards in the X-axis direction and extends outwards in the Z-axis direction from the upper tip of the flange engaging part 24*a*. More specifically, the bobbin hook 25*a* extends outwards in the Y-axis direction than the face at the outer side in the Y-axis direction of the flange engaging part 24*a*. Also, the bobbin hook 25*a* extends inwards in the X-axis direction than the face at the inner side in the X-axis direction of the flange engaging part 24*a*. A cross section area along the XY plane of the bobbin hook 25*a* is larger than a cross section area along the XY plane of the flange engaging part 24*a*. The bobbin hook 25*a* has a function to prevent a position shifting of the lead parts 41*a* and/or 41*b*, which are pulled out along the circumference of the flange engaging part 24*a*, of the first coil part 41 to the upper side of the flange engaging part 24*a* (locking function).

The configuration and the function of the flange engaging part 24*b* formed at the upper side of the flange main part 220*b*, and the configuration and the function of the bobbin hook 25*b* formed to the tip of the flange engaging part 24*b* are omitted from explaining as these are the same as the flange engaging part 24*a* and the bobbin hook 25*a* mentioned in above. Note that, the bobbin hook 25*b* has a function to prevent a position shifting of the lead parts 42*a* and/or 42*b*, which are pulled out along the circumference of the flange engaging part 24*b*, of the second coil part 42 to the upper side direction of the flange engaging part 24*b* (locking function).

Figure 8:
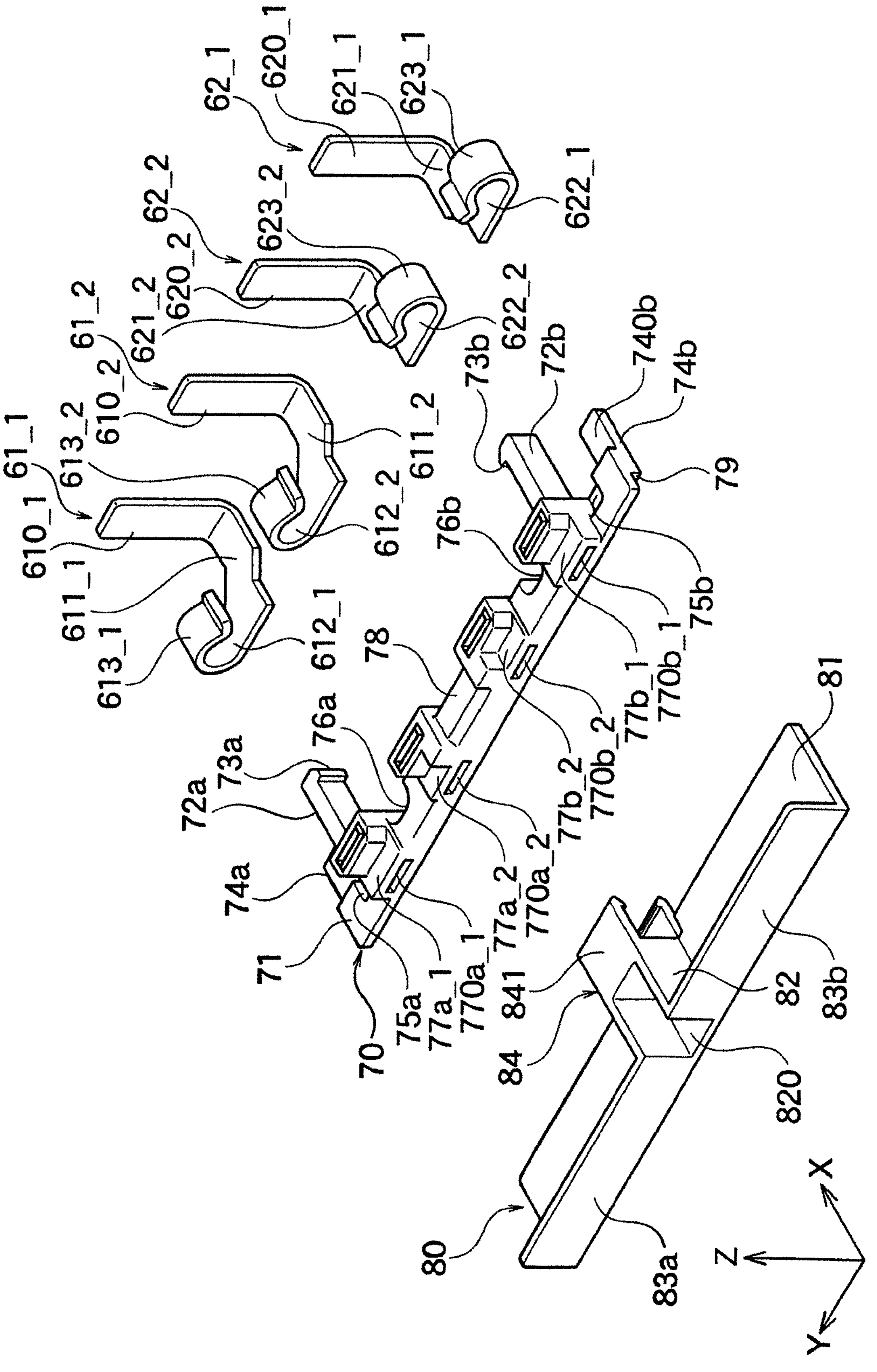
FIG. 8 is a perspective view of a terminal, a terminal block, and a cover shown in FIG. 3.

At one end of the bobbin 20 in the Y-axis direction, the terminal block fixing part 23*a* is formed to which one end of the terminal block 70 in the Y-axis direction is fixed (see FIG. 8). At the other end of the bobbin 20 in the Y-axis direction, the terminal block fixing part 23*b* is formed to which the other end of the terminal block 70 in the Y-axis direction is fixed. The terminal block fixing parts 23*a* and 23*b* have a function to fix the terminal block 70, and when the first wire 41*c* and the second wire 42*c* are wound to the winding part 21 using an auto-winding machine, the terminal block fixing parts 41*c* and 42*c* also function to fix part of the auto-winding machine.

The terminal block fixing part 23*a* includes a fixing main part 230*a*, a bobbin raised part 30*a*, and a bobbin step part 31*a*. The terminal block fixing part 23*b* includes a fixing main part 230*b*, a bobbin raised part 30*b*, and a bobbin fixing part 31*b*.

The fixing main parts 230*a* and 230*b* are each formed approximately in a flat board shape having a face which is approximately parallel o the XY plane. The fixing main parts 230*a* and 230*b* each have a predetermined thickness in the Z-axis direction. The widths of the fixing main parts 230*a* and 230*b* along the X-axis direction are larger than the width of the winding part 21 in the X-axis direction; and the widths of the fixing main parts 230*a* and 230*b* along the X-axis direction are about the same as the widths of the flange main parts 220*a* and 220*b* in the X-axis direction. The fixing main part 230*a* is integrally connected to a face at the outer side of the flange main part 220*a* of the flange 22*a* in the Y-axis direction, and it protrudes out to the Y-axis direction from this face. The fixing main part 230*b* is integrally connected to a face at the outer side of the flange main part 220*b* of the flange 22*b* in the Y-axis direction, and it protrudes out to the Y-axis direction from this face.

The bobbin raised parts 30*a* and 30*b* are projecting pieces having protruding shapes; and the bobbin raised parts 30*a* and 30*b* project out by predetermined lengths. The bobbin raised parts 30*a* and 30*b* protrude out to the outer side along the X-axis direction respectively from the lateral side parts (side faces) in the X-axis direction of the fixing main part 230*a* and 230*b*. The direction of projections of the bobbin raised parts 30*a* and 30*b* correspond respectively to the direction to which the terminal block 70 is provided.

The bobbin raised parts 30*a* and 30*b* are each formed approximately in a rectangular parallelepiped shape which is also a flat form. The thicknesses of the bobbin raised parts 30*a* and 30*b* in the Z-axis direction are smaller than the thicknesses of the fixing main parts 230*a* and 230*b* in the Z-axis direction. The bobbin raised part 30*a* engages with a terminal block recessed part 75*a* of the terminal block 70 (see FIG. 8), and the bobbin raised part 30*b* engages with a terminal block recessed part 75*b* of the terminal block 70 (see FIG. 8).

The bobbin step part 31*a* is formed to the back face of the fixing main part 230*a*, and it is formed at a corner end where an end (lateral side part) of the fixing main part 230*a* in the X-axis negative direction and an end of the fixing main part 230*a* in the Y-axis positive direction intercept. The bobbin step part 31*b* is formed to the back face of the fixing main part 230*b*, and it is formed at a corner end where an end (lateral side part) of the fixing main part 230*b* in the X-axis negative direction and an end of the fixing main part 230*b* in the Y-axis positive direction intercept.

The bobbin step part 31*a* is formed adjacent to the bobbin raised part 30*a*, and the bobbin step part 31*b* is formed adjacent to the bobbin raised part 30*b*. Also, the bobbin raised part 30*a* is formed between the flange engaging part 24*a* and the bobbin step part 31*a* in the Y-axis direction; and the bobbin raised part 30*b* is formed between the flange engaging part 24*b* and the bobbin step part 31*b* in the Y-axis direction.

The flange engaging part 24*a*, the bobbin raised part 30*a*, and the bobbin step part 31*a* each function to engage with the terminal block 70, and these are provided near an end of the fixing main part 230*a* in the X-axis direction. The flange engaging part 24*b*, the bobbin raised part 30*b*, and the bobbin step part 31*b* each function to engage with the terminal block 70, and these are provided near an end of the fixing main part 230*b* in the X-axis direction.

The bobbin step parts 31*a* and 31*b* form steps to the back faces of the fixing main parts 230*a* and 230*b*. The bobbin step parts 31*a* and 31*b* have step shapes (recessed shapes) which are recessed in predetermined depths from the back faces of the fixing main parts 230*a* and 230*b* to the Z-axis direction; and the shapes of the bobbin step parts 31*a* and 31*b* viewing from the Z-axis direction are approximately in rectangular shapes (see FIG. 10).

The bobbin step part 31*a* has a lower step face 310*a* which is a face approximately parallel to the back face of the fixing main part 230*a* (a face having approximately rectangular shape with predetermined lengths in the X-axis direction and the Y-axis direction). The bobbin step part 31*b* has a lower step face 310*b* which is a face approximately parallel to the back face of the fixing main part 230*b* (a face having approximately rectangular shape with predetermined lengths in the X-axis direction and the Y-axis direction). The lower step faces 310*a* and 310*b* constitute the lower faces of the steps forming the bobbin step parts 31*a* and 31*b*. Note that, the upper faces of the steps forming the bobbin step parts 31*a* and 31*b* are the back faces of the fixing main parts 230*a* and 230*b*. The bobbin step part 31*a* engages with the terminal block step part 74*a* of the terminal block 70 (see FIG. 8), and the bobbin step part 31*b* engages with the terminal block step part 74*b* of the terminal block 70 (see FIG. 8).

At the upper side of the flange main part 220*a*, an extended flange part 27*a* is formed. The extended flange part 27*a* is integrally connected to the upper side of the flange main part 220a, and it extends approximately parallel to the XZ plane from the flange main part 220a. That is, the extended flange part 27a has a shape that the flange main part 220a is extended to the upper side, and constitutes part of the flange main part 220a. The extended flange part 27a has a predetermined thickness in the Y-axis direction, and also has a face which is approximately parallel to the XZ plane.

The above-mentioned flange engaging part 24a is formed at an end in the X-axis negative direction of the upper end of the flange main part 220a; and the extended flange part 27a is formed at an end in the X-axis positive direction of the upper end of the flange main part 220a. The extended flange part 27a is provided by taking a predetermined space from the flange engaging part 24a in the X-axis direction; and the extended flange part 27a projects to the upper side than the fixing main part 230a of the terminal block fixing part 23a.

A partition 26a is formed between the flange engaging part 24a and the extended flange part 27a. The flange engaging part 24a, the extended flange part 27a, and the partition 26a are provided along the X-axis direction. The partition 26a is integrally connected to the upper side of the flange main part 220a, and it extends approximately parallel to the XZ plane from the flange main part 220a. That is, the partition 26a has a shape extending to the upper side from the flange main part 220a, and constitutes part of the flange main part 220a. The partition 26a has a predetermined thickness in the Y-axis direction, and has a face which is approximately parallel to the XZ plane.

An extended flange part 27b and a partition 26b are formed at the upper side of the flange main part 220b. The extended flange part 27b and the partition 26b are configured the same as the extended flange part 27a and the partition 26a, hence detailed descriptions of the extended flange part 27b and the partition 26b are omitted.

A notch 28a is formed between the flange engaging part 24a and the partition 26a; and a notch 29a is formed between the extended flange part 27a and the partition 26a. Either one of the lead parts 41a and 41b of the first wire 41c can pass through the notch 28a (see FIG. 3). The same applies to the notch 29a.

A notch 28b is formed between the flange engaging part 24b and the partition 26b; and a notch 29b is formed between the extended flange part 27b and the partition 26b. Either one of the lead parts 42a and 42b of the second wire 42c can pass through the notch 28b (see FIG. 3). The same applies to the notch 29b.

Figure 2:
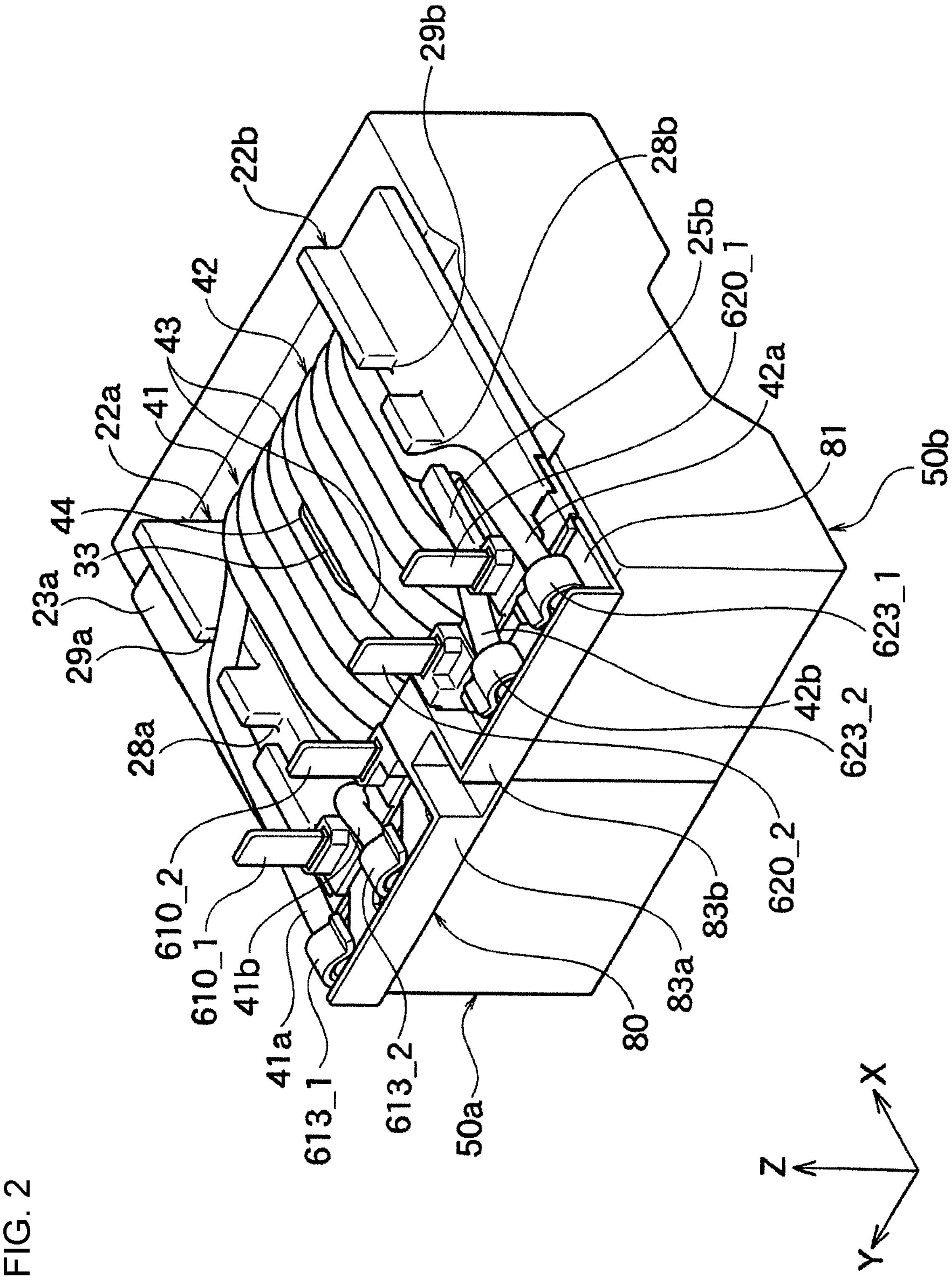
FIG. 2 is a perspective view of the coil device shown in FIG. 1 but a case and a resin have been omitted in this figure.

In the present embodiment, as shown in FIG. 2, among the lead parts 41a and 41b, the lead part 41a passes through the notch 29a, and the lead part 41a is pulled to the outer side from the inner side of the flange 22a in the Y-axis direction via the notch 29a. Further, the lead part 41a is pulled out towards the terminal block 70 from the outer side of the flange 22a in the Y-axis direction. Thus, unnecessary drawing of the lead part 41a can be prevented when the lead part 41a is pulled out towards the terminal block 70.

On the other hand, the lead part 41b is pulled out towards the terminal block 70 from the inner side of the flange 22a in the Y-axis direction without passing through the notches 28a and 29a. As a result, the lead part 41a runs at the outer side of the flange engaging part 24a in the Y-axis direction, and the lead part 41b runs at the inner side of the flange engaging part 24a in the Y-axis direction. Thus, the lead part 41a and the lead part 41b can be securely insulated due to the flange engaging part 24a.

Also, the partition part 26a is formed between the notch 28a and the notch 29a, thus the position of the lead part 41a passing through the notch 29a is adjusted by the partition 26a. Also, the partition 26a can prevent the lead part 41a from shifting its position.

Among the lead parts 42a and 42b, the lead part 42a is passed through the notch 28b, and the lead part 42a is pulled out towards the outer side from the inner side of the flange 22b in the Y-axis direction via the notch 28b. Further, the lead part 42a is pulled out towards the terminal block 70 from the outer side of the flange 22b in the Y-axis direction. Thus, unnecessary drawing of the lead part 42a can be prevented when the lead part 42a is pulled towards the terminal block 70.

On the other hand, the lead part 42b is pulled out towards the terminal block 70 from the inner side of the flange 22b in the Y-axis direction without passing through the notches 28b and 29b. As a result, the lead part 42a runs at the outer side of the flange engaging part 24b in the Y-axis direction, and the lead part 42b runs at the inner side of the flange engaging part 24b in the Y-axis direction. Thus, the lead part 42a and the lead part 42b can be securely insulated due to the flange engaging part 24b.

The partition 26b is formed between the notch 28b and the notch 29b, thus the position of the lead part 42a passing through the notch 28b is adjusted by the partition 26b. Also, the partition 26b can prevent the lead part 42a from shifting its position.

Figure 7:
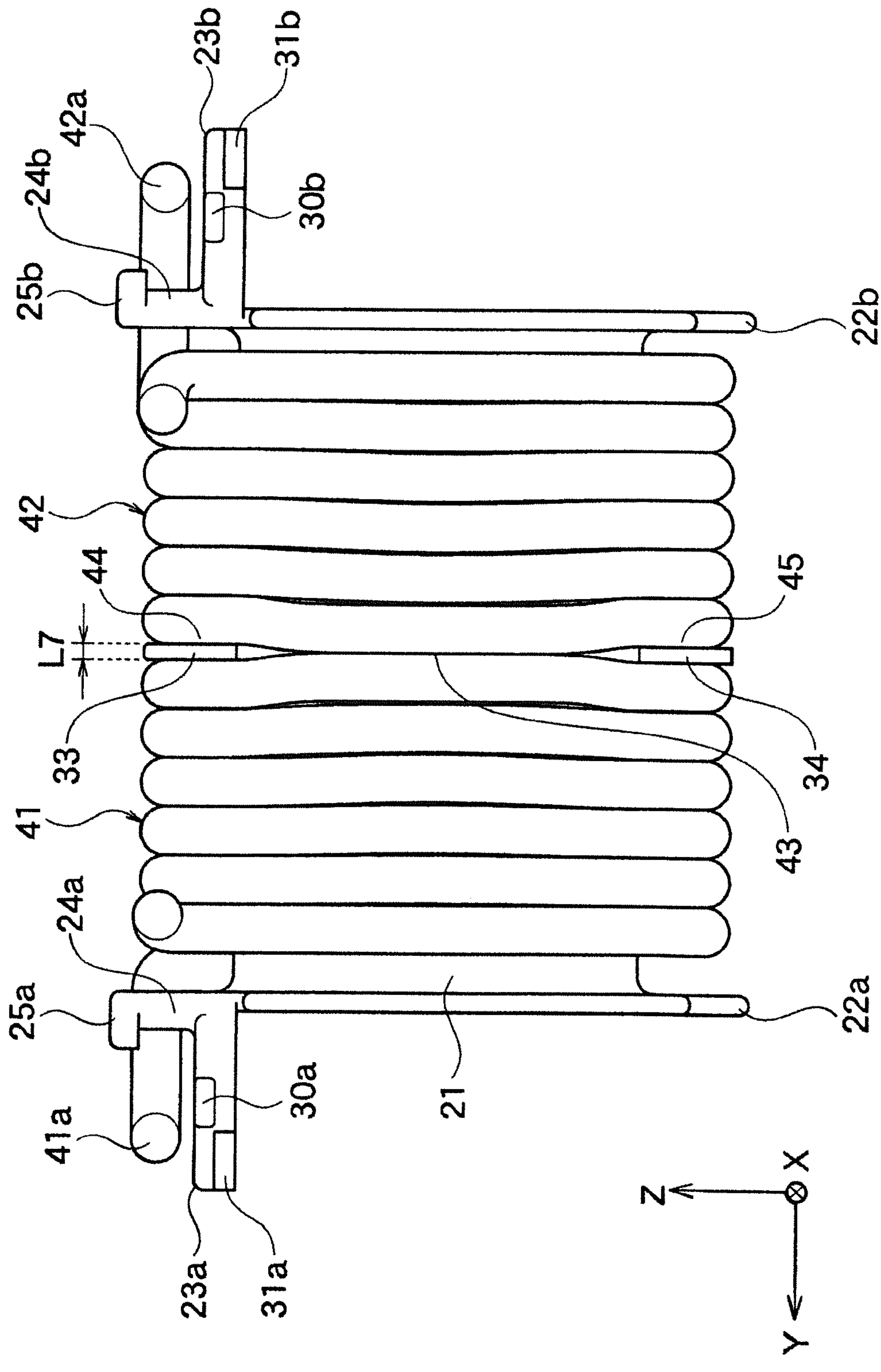
FIG. 7 is a side view of the bobbin shown in FIG. 6 provided with a first coil part and a second coil part.

As shown in FIG. 6 and FIG. 7, in the present embodiment, the winding part 21 includes the projection parts 33 and 34. The projection parts 33 and 34 function to adjust a leakage property between the first coil part 41 (see FIG. 3) and the second coil part 42 depending on the length along the circumference direction of the winding part 21 (or the length along the X-axis direction) or the length along the Y-axis direction (thickness).

The projection parts 33 and 34 are integrally formed on the outer circumference face of the winding part 21, and the projection parts 33 and 34 project towards the outer side from the outer circumference face of the winding part 21. Also, the projection parts 33 and 34 extends along the circumference direction of the winding part 21. The projection parts 33 and 34 are formed on the face at the longitudinal side among the outer circumference faces of the winding part 21. That is, the projection part 33 is formed on the upper portion of the outer circumference face of the winding part 21, and the projection part 34 is formed on the lower portion of the outer circumference face of the winding part 21. Note that, the upper portion and the lower portion of the outer circumference face of the winding part 21 is approximately a flat surface, and the projection parts 33 and 34 may preferably be formed to the flat face of the winding part 21 as mentioned in above rather than on the curved face (the lateral side portion) of the winding part 21.

The projection parts 33 and 34 are formed approximately at a center area in the axis direction (Y-axis direction) of the winding part 21. The projection part 33 and the projection part 34 are provided to the opposite side of each other in a radial direction of the winding part 21, and these are formed so that the position of the projection part 33 in the Z-axis direction and the position of the projection part 34 in the Z-axis direction coincide each other.

The projection parts 33 and 34 have the same shapes, and the projection parts 33 and 34 are each formed approximately in a rectangular parallelepiped shape (flat shape) so that the longitudinal direction (X-axis direction) is perpendicular to the axis direction of the winding part 21. The projection parts 33 and 34 each have a length along the X-axis direction which is longer than a length in the Z-axis direction (height). The projection parts 33 and 34 each have the length in the Z-axis direction which is larger than a thickness along the Y-axis direction. At the end of the projection part 33 in the Z-axis direction (the upper end), a curved surface is formed (the corner end is curved), however the shape of the projection part 33 is not particularly limited to this. Although detailed description is omitted, the same applies to the projection part 34.

Figure 9:
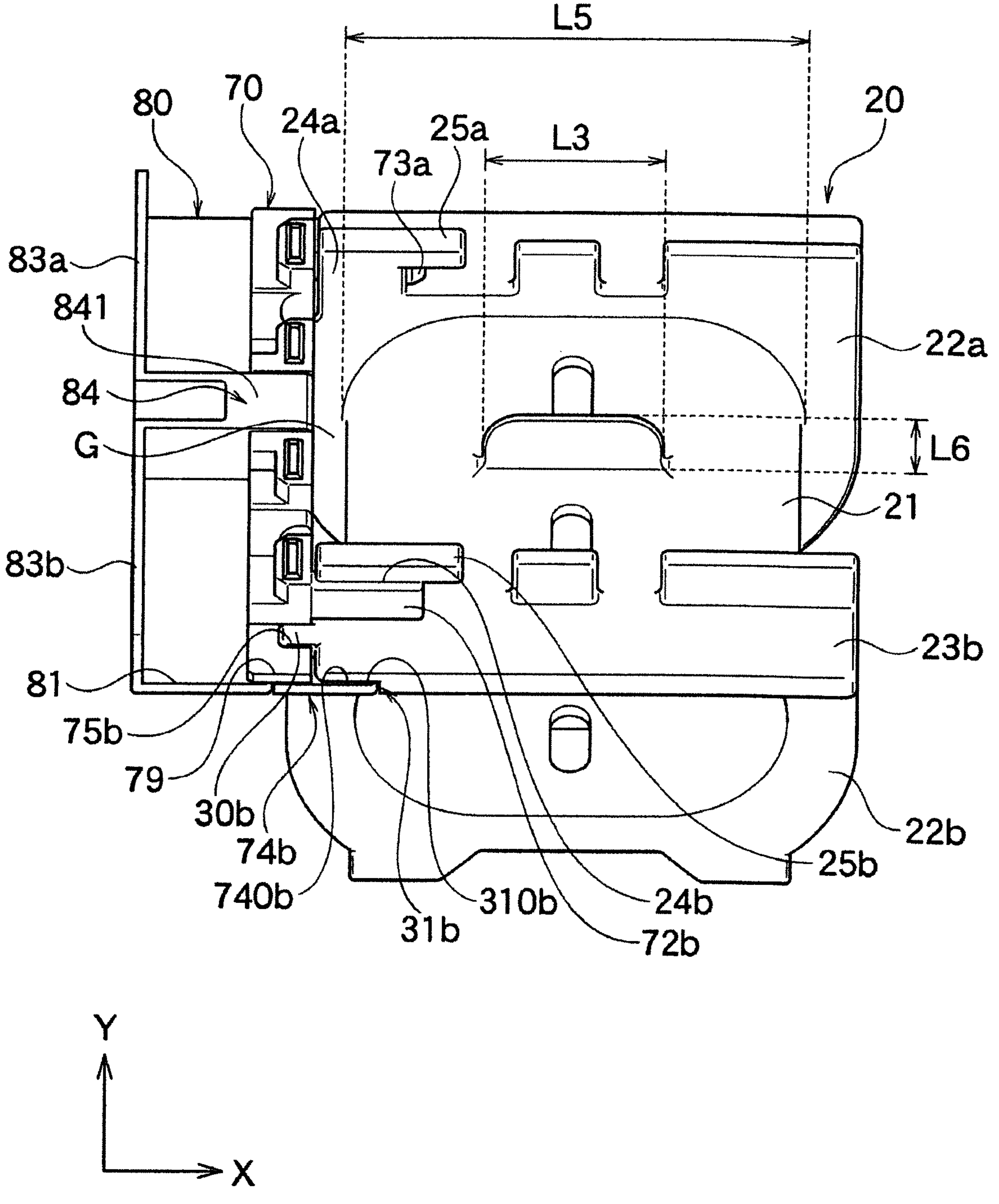
FIG. 9 is a perspective view of the bobbin shown in FIG. 6 which has been installed with the terminal block and the cover shown in FIG. 8.

The length of the projection part 33 in the circumference direction of the winding part 21 (that is, the length along the X-axis direction of the projection part 33) is shorter than the length along the circumference direction of the winding part 21. As shown in FIG. 9, a length L3 of the projection part 33 along the circumference direction of the winding part 21 (or the length along the X-axis direction of the projection part 33) and a length L4 of the winding part 21 along the circumference (the entire circumference length of the winding part 21 (not shown in the figure)) may preferably satisfy a ratio L3/L4 of $0<L3/L4<1/2$, more preferably of $0<L3/L4<1/4$, and particularly preferably of $1/10<L3/L4<1/5$. By adjusting the ratio L3/L4 within the above-mentioned ranges, the leakage property between the first coil part 41 (see FIG. 3) and the second coil part 42 can be controlled appropriately. Note that, the same applies to a ratio between a length of the projection part 34 in the circumference direction of the winding part 21 (the length of the projection part 34 in the X-axis direction) and the length along the circumference direction of the winding part 21.

The length of the projection part 33 in the circumference direction of the winding part 21 (that is, the length of projection part 33 in the X-axis direction) is shorter than the length of winding part 21 in the X-axis direction. The length L3 of the projection part 33 of the winding part 21 in the circumference direction (that is, the length of the projection part 33 in the X-axis direction) and a length L5 of the winding part 21 in the X-axis direction may preferably satisfy a ratio L3/L5 of $0<L3/L5<1$, more preferably $0<L3/L5<3/4$, and particularly preferably $1/6<L3/L5<2/3$. By adjusting the ratio L3/L5 within the above-mentioned ranges, the leakage property between the first coil part 41 (see FIG. 3) and the second coil part 42 can be controlled appropriately. Note that, the same applies to a ratio between a length of the projection part 34 in the circumference direction of the winding part 21 (that is, the length of the projection part 34 in the X-axis direction) and the length in the X-axis direction of the winding part 21.

A length L6 of the projection part 33 in the Z-axis direction is, for example, determined depending on a wire size of the first wire 41*a* (see FIG. 3) or a wire size of the second wire 42*c*. In the present embodiment, the first wire 41*c* and the second wire 42*c* are each wound around the winding part 21 along the radial direction in two layers. Thus, in order to securely fix the first coil part 41 and the second coil part 42 using the projection part 33, preferably the length L6 may be twice or larger than the wire size of the first wire 41*c* or the wire size of the second wire 42*c*. That is, preferably the length L6 may be higher than a height of the first coil part 41 and/or a height of the second coil part 42 from the outer circumference face of the winding part 21. Note that, the same applies to the length of the projection part 34 in the Z-axis direction.

The length L6 of the projection part 33 in the Z-axis direction is determined as mentioned in above, thus due to the projection part 33, the position shifting of the first wire 41*c* and the position shifting of the second wire 42*c* to the Y-axis direction are effectively prevented at the position of the projection part 33. Also, by fixing the first wire 41*c* and the second wire 42*c* to the projection part 33, the first coil part 41 and the second coil part 42 are prevented from becoming loose. Also, when the first wire 41*c* and the second wire 42*c* are wound to the outer circumference face of the winding part 21 by moving back and forth between the end of the winding part 21 in the axis direction and the projection parts 33 and 34, the first wire 41*c* and the second wire 42*c* can be wound back while being securely fixed to the projection parts 33 and 34. Thus, the position shifting and variations in the number of turns of the first coil part 41 and the second coil part 42 can be prevented.

As shown in FIG. 7, a length L7 of the projection part 33 of the winding part 21 along the axis direction may preferably be smaller than wire sizes of the first wire 41*c* or the second wire 42*c*. In the present embodiment, the length L7 of the projection part 33 is approximately the same as the thickness of the flanges 22*a* or 22*b* in the Y-axis direction.

As shown in FIG. 2 and FIG. 7, the first coil part 41 is provided towards one end in the Y-axis direction than the projection parts 33 and 34; and the second coil part 42 is provided towards the other end in the Y-axis direction than the projection parts 33 and 34. That is, the projection parts 33 and 34 are provided between the first coil part 41 and the second coil part 42 in terms of the Y-axis direction.

The projection parts 33 and 34 are provided between the first coil part 41 and the second coil part 42; and the first coil part 41 and the second coil part 42 are partially in contact with each other along the circumference direction of the winding part 21. That is, when the winding part 21 is viewed along its circumference direction, the projection part 33 is placed between the first coil part 41 and the second coil part 42, thus the first coil part 41 and the second coil part 42 are not in contact at the position where the projection part 33 is formed. That is, the projection part 33 separates the first coil part 41 and the second coil part 42 in the Y-axis direction; thus, a non-contacting area 44 is formed between the first coil part 41 and the second coil part 42.

Also, the projection part 34 is placed between the first coil part 41 and the second coil part 42, thus the first coil part 41 and the second coil part 42 are not in contact with each other at the position where the projection part 34 is formed. That is, the projection part 34 separates the first coil part 41 and the second coil part 42 in the Y-axis direction; thus, a non-contacting area 45 is formed between the first coil part 41 and the second coil part 42.

On the other hand, at the position where the projection parts 33 and 34 are not formed, the first coil part 41 and the second coil part 42 are in contact with each other since the projection parts 33 and 34 do not exist between the first coil part 41 and the second coil part 42. Hence, a contacting area 43 is formed between the first coil part 41 and the second coil part 42.

The contacting area 43 is formed between the non-contacting area 44 and the non-contacting area 45, and it is formed at an area along a part of the winding part 21 of the circumference direction. The contacting area 43 is formed by crossing over the upper portion and the lower portion of the outer circumference face of the winding part 21 from the lateral side portion of the outer circumference face of the winding part 21. The contacting area 43 extends in a predetermined length by bending roughly into a C-shape. The contacting area 43 is discontinuously formed at one side and the other side of the winding part 21 in the X-axis direction. The non-contacting areas 44 and 45 are respectively formed at the upper portion and the lower portion of outer circumference face of the winding part 21, and these extend in predetermined lengths along the X-axis direction. The contacting area 43 and the non-contacting areas 44 and 45 are formed in an alternating manner along the circumference direction of the winding part 21.

The length of the contacting area 43 of the winding part 21 along the circumference direction is longer than the length of the non-contacting areas 44 or 45 of the winding part 21 along the circumference direction; and a large portion of the first coil part 41 and a large portion of the second coil part 42 are in contact with each other along the circumference direction. The non-contacting areas 44 and 45 are partially formed between the first coil part 41 and the second coil part 42, thus the leakage property between the first coil part 41 and the second coil part 42 can be appropriately controlled.

As shown in FIG. 3, the terminal block 70 is formed separately from the bobbin 20, and it is installed to the bobbin 20 in a re-installable manner. The terminal block 70 may be formed by the same insulation materials as the bobbin 20, and the terminal block 70 may preferably be formed of an insulation material having a better moldability or a better heat resistance. The terminal block 70 is installed to the bobbin 20 at a lateral side in an X-axis negative direction of the winding part 21, and at a position spaced away from the outer circumference face of the winding part 21 in a direction perpendicular (X-axis direction) to the axis direction of the winding part 21. Thus, between the terminal block 70 and the side portion of the outer circumference of the winding part 21, a space G having a predetermined length in the X-axis direction (see FIG. 9) is formed along the axis direction of the winding part 21.

As shown in FIG. 8, the terminal block 70 includes a terminal block base part 71, arms 72*a* and 72*b*, terminal block hooks 73*a* and 73*b*, terminal block step parts 74*a* and 74*b*, terminal block recessed parts 75*a* and 75*b*, lead insertion grooves 76*a* and 76*b*, terminal block fixing parts 77*a*_1 and 77*a*_2, terminal block fixing parts 77*b*_1 and 77*b*_2, a cover mounting part 78, and a bottom fixing part 79.

The terminal block base part 71 is made of a columnar body which is approximately a rectangular parallelepiped shape having a longitudinal direction in the Y-axis direction. The terminal block base part 71 is provided to the lateral side from the winding part 21 in the X-axis direction, and at a position approximately parallel to the axis direction of the winding part 21. The length of the terminal block base part 71 along the Y-axis direction is approximately the same as the length of the bobbin 20 along the Y-axis direction. As shown in FIG. 5, the terminal block base part 71 (the bottom face of the terminal block base part 71) is provided at a position spaced away in the X-axis direction from the lateral side portion of the outer circumference face of the winding part 21 and at an upper side than the center part of the winding part 21 in the Z-axis direction. Also, the position of the terminal block base part 71 is higher than the upper portion of the outer circumference face of the winding part 21. Note that, the height position of the terminal block base part 71 is not particularly limited to this; and the terminal base part 71 (the bottom face of the terminal block base part 71) may be approximately at the same height position as the upper portion of the outer circumference face of the winding part 21, or it may be lower than this.

As shown in FIG. 5 and FIG. 9, the terminal block base part 71 is provided at a position taking a space G from the outer circumference face of the winding part 21 towards the lateral side in the X-axis direction, thus an end of the terminal block base part 71 in the X-axis positive direction (the side where the bobbin is positioned) and the outer circumference face of the winding part 21 are not overlapping in the Z-axis direction.

Note that, the position of the terminal block base part 71 may be shifted to the X-axis positive direction; and the end of the terminal block base part 71 in the X-axis positive direction and the outer circumference face of the winding part 21 may overlap in the Z-axis direction (when viewed from the Z-axis direction). That is, as long as a predetermined distance is taken between the terminal block base part 71 and the outer circumference face of the winding part 21 in the radial direction of the winding part 21, then the position of the terminal block base part 71 is not particularly limited. For example, the terminal block base part 71 may be provided at a position by taking a predetermined distance from an arbitrary point on the outer circumference face of the winding part 21 to the lateral side of the winding part 21 (the X-axis negative direction), and also at a position by taking a predetermined distance from said arbitrary position of the outer circumference face of the winding part 21 towards the upper side of the winding part 21 (the Z-axis positive direction).

The position of an end (lateral side part) of the terminal block base part 71 in the X-axis positive direction is approximately the same as the ends of the flange engaging parts 24*a* and 24*b* of the bobbin 20 in the X-axis negative direction. The end of the terminal block base part 71 in the X-axis positive direction and the ends of the flange engaging parts 24*a* and 24*b* of the bobbin 20 in the X-axis negative direction are arranged in close proximity.

As shown in FIG. 8, the arm 72*a* is formed to one side of the terminal block base part 71 in the Y-axis direction; and the arm 72*b* is formed to the other side of the terminal block base part 71 in the Y-axis direction. The arms 72*a* and 72*b* extend in the predetermined lengths towards the bobbin 20 from the end (lateral side) of the terminal block base part 71 of the X-axis direction. As shown in FIG. 9, the lengths of the arms 72*a* and 72*b* in the X-axis direction are longer than the length of the above-mentioned space G in the X-axis direction, and the lengths of the arms 72*a* and 72*b* in the X-axis direction are approximately the same as the length of the flange engaging parts 24*a* and 24*b* in the X-axis direction.

As shown in FIG. 8, the terminal block hook 73*a* formed in a hook shape is formed at the tip of the arm 72*a*, and the terminal blook hook 73*b* formed in a hook shape is formed at the tip of the arm 72*b*. The terminal block hooks 73*a* and 73*b* extend in predetermined lengths towards each other (extend to the inner side of the terminal block 70) along the Y-axis direction from the tip of the arms 72*a* and 72*b*. The terminal block hooks 73*a* and 73*b* extend in the direction which is perpendicular to the longitudinal direction of the arms 72*a* and 72*b*.

Figure 10:
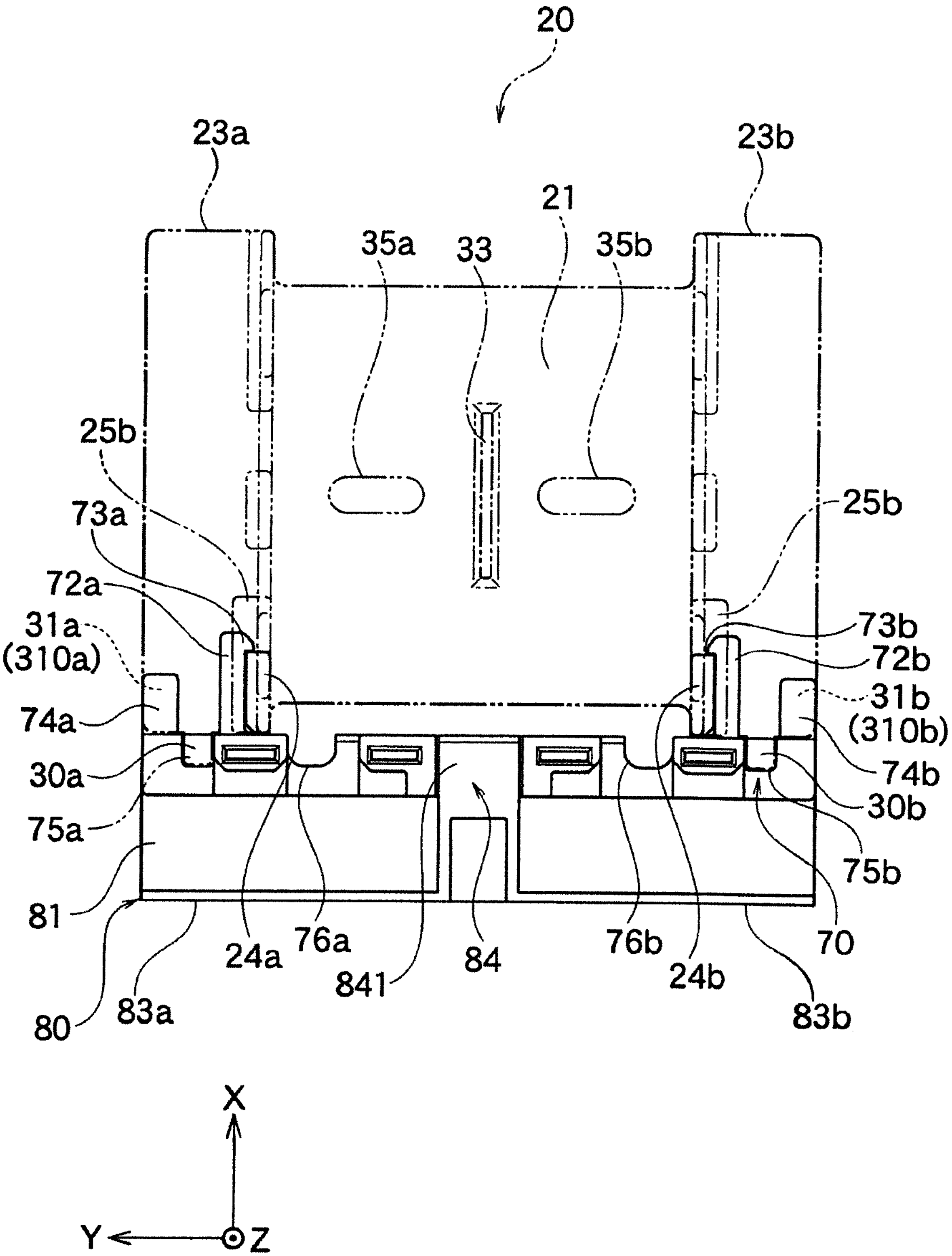
FIG. 10 is a perspective view of a configuration of a connection between the terminal block and the bobbin shown in FIG. 9.

As shown in FIG. 10, the arm 72*a* is arranged along the outer surface of the flange engaging part 24*a* of the bobbin 20 in the Y-axis direction while the terminal block 70 is fixed to the terminal block fixing parts 23*a* and 23*b* of the bobbin 20; and the terminal block hook 73*a* engages with the side part of the flange engaging part 24*a* in the X-axis positive direction. Also, the arm 72*b* is arranged along the outer surface of the flange engaging part 24*b* of the bobbin 20 in the Y-axis direction, and the terminal block hook 73*b* engages with the lateral side part of the flange engaging part 24*b* in the X-axis positive direction. Thereby, the terminal block 70 is installed to the terminal block fixing parts 23*a* and 23*b* via the arms 72*a* and 72*b*.

Note that, the lead part 41*a* of the first wire 41*c* shown in FIG. 2 is pulled out along the circumference of the arm 72*a* towards the terminal block 70 while the terminal block hook 73*a* is engaged with the flange engaging part 24*a*. Also, the lead part 42*a* of the second wire 42*c* shown in FIG. 2 is pulled out along the circumference of the arm 72*b* towards the terminal block 70 while the terminal block hook 73*b* is engaged with flange engaging part 24*b*. The lead parts 41*a* and 41*b* are respectively pulled out along the outer side surfaces of the arms 72*a* and 72*b* (the faces at the outer side in the Y-axis direction), thus the arms 72*a* and 72*b* have a function to guide the lead parts 41*a* and 41*b* towards the terminal block 70.

As shown in FIG. 8, the terminal block step part 74*a* is formed at one end of the terminal block base part 71 in the Y-axis direction, and the terminal block step part 74*b* is formed at another end of the terminal block base part 71 in the Y-axis direction. The terminal block step parts 74*a* and 74*b* are arranged further outside in the Y-axis direction than the arms 72*a* and 72*b*.

The terminal block step part 74*a* has a step lower face 740*a* which is a face approximately parallel to the upper or lower face of the terminal block base part 71 (that is, the face which is approximately rectangular shape having predetermined lengths in the X-axis direction and the Y-axis direction). The terminal block step part 74*b* has a step lower face 740*b* which is a face approximately parallel to the upper or lower face of the terminal block base part 71 (that is, the face which is approximately rectangular shape having predetermined lengths in the X-axis direction and the Y-axis direction). The step lower faces 740*a* and 740*b* constitute the lower faces of the steps forming the terminal block step parts 74*a* and 74*b*.

As shown in FIG. 9 and FIG. 10, the terminal block step parts 74*a* and 74*b* engage respectively with the bobbin step parts 31*a* and 31*b* of the bobbin 20. More specifically, the terminal block step parts 74*a* and 74*b* engage respectively with the bobbin step parts 31*a* and 31*b* while the step lower faces 740*a* and 740*b* of the terminal block step parts 74*a* and 74*b* are in contact with the step lower faces 310*a* and 310*b* of the bobbin step parts 31*a* and 31*b*.

As shown in FIG. 8, the terminal block recessed part 75*a* is formed at one end of the terminal block base part 71 in the Y-axis direction, and the terminal block recessed part 75*b* is formed at another end of the terminal block base part 71 in the Y-axis direction. The terminal block recessed part 75*a* is provided between the arm 72*a* and the terminal block step part 74*a* in the Y-axis direction; and the terminal block recessed part 75*b* is provided between the arm 72*b* and the terminal block step part 74*b* in the Y-axis direction. The terminal block recessed parts 75*a* and 75*b* are recessed portions with predetermined depths; and the X-axis positive direction sides of the terminal block recessed parts 75*a* and 75*b* are opened. The depths of the terminal block recessed parts 75*a* and 75*b* are approximately the same as the depths of the bobbin raised parts 30*a* and 30*b* of the bobbin 20 in the Z-axis direction (see FIG. 6).

The terminal block recessed parts 75*a* and 75*b* are recessed in predetermined lengths from one end (lateral side part) of the terminal block base part 71 in the X-axis positive direction towards the X-axis negative direction. The bottom faces of the terminal block recessed parts 75*a* and 75*b* are approximately rectangular shaped, and the shapes of these correspond to the shapes of the upper and lower faces of the bobbin raised parts 30*a* and 30*b* of the bobbin 20.

As shown in FIG. 9 and FIG. 10, the terminal block recessed parts 75*a* and 75*b* engage respectively with the bobbin raised parts 30*a* and 30*b* of the bobbin 20. More specifically, the bobbin raised parts 30*a* and 30*b* are respectively housed into the terminal block recessed parts 75*a* and 75*b*, thereby the terminal block recessed parts 75*a* and 75*b* are engaged with the bobbin raised parts 30*a* and 30*b*.

As such, in the present embodiment, the position shifting of the terminal block 70 in the X-axis direction against the terminal block fixing parts 23*a* and 23*b* can be prevented by engaging the terminal block hooks 73*a* and 73*b* with the flange engaging parts 24*a* and 24*b* as a first engaged portion.

Also, the position shifting of the terminal block 70 in the Z-axis direction against the terminal block fixing parts 23*a* and 23*b* can be prevented by engaging the terminal block step parts 74*a* and 74*b* with the bobbin step parts 31*a* and 31*b* as a second engaged portion.

Also, the position shifting of the terminal block 70 in the Y-axis direction against the terminal block fixing parts 23*a* and 23*b* can be prevented by engaging the terminal block step parts 74*a* and 74*b* with the bobbin raised parts 30*a* and 30*b* as a third engaged portion. Thereby, the terminal block 70 can be installed to the terminal block fixing parts 23*a* and 23*b* with a sufficient fixing strength.

Also, due to the engagements of the above-mentioned first to third engaged portions, the terminal block 70 can be connected to one end and the other end of the winding part 21 in the axis direction, and the terminal block 70 can be arranged approximately parallel to the axis direction of the winding part 21. The terminal block 70 is fixed to the terminal block fixing parts 23*a* and 23*b* by three-point mounting using the above-mentioned first to third engaged portions, and there is no need to use adhesives and the like for fixing. Note that, among the above-mentioned first to third engaged portions, one of these may not be needed. Also, if necessary, adhesives and the like may be used to reinforce the fixing strength.

As shown in FIG. 8, the cover mounting part 78 is formed at a position which is approximately at a center of the terminal block base part 71 in the Y-axis direction. The cover mounting part 78 has an upper face and a lower face which are approximately flat surfaces. A holding part 84 of the cover 80 are fixed to the cover mounting part 78.

The terminal block fixing parts 77*a*_1 and 77*a*_2 are formed to one side in the Y-axis direction than the cover mounting part 78. The terminal block fixing part 77*a*_1 is arranged further out to the Y-axis direction than the terminal block fixing part 77*a*_2. The terminal block fixing parts 77*a*_1 and 77*a*_2 are formed thicker than the surrounding areas; and the terminals 61_1 and 61_2 can be fixed respectively to terminal block fixing parts 77*a*_1 and 77*a*_2.

At the terminal fixing parts 77*a*_1 and 77*a*_2, terminal insertion grooves 770*a*_1 and 770*a*_2 are respectively formed. The terminal insertion grooves 770*a*_1 and 770*a*_2 are grooves which are bent approximately in L-shape corresponding to the shapes of the terminals 61_1 and 61_2. Note that, the terminals 61_1 and 61_2 are fixed to the terminal fixing parts 77*a*_1 and 77*a*_2 by integral molding (insert molding).

The terminal fixing parts 77*b*_1 and 77*b*_2 are formed to the other side of the Y-axis direction than the cover mounting part 78. The terminal fixing parts 77*b*_1 is formed to the outer side of the Y-axis direction than the terminal fixing part 77*b*_2. The terminal fixing parts 77*b*_1 and 77*b*_2 are formed thicker than the surrounding areas; and the terminals 62_1 and 62_2 can be respectively fixed to the terminal block fixing parts 77*b*_1 and 77*b*_2.

At the terminal fixing parts 77*b*_1 and 77*b*_2, terminal insertion grooves 770*b*_1 and 770*b*_2 are respectively formed. The terminal insertion grooves 770*b*_1 and 770*b*_2 are grooves which are bent approximately in L-shape corresponding to the shapes of the terminals 62_1 and 62_2. Note that, the terminals 62_1 and 62_2 are fixed to the terminal fixing parts 77*b*_1 and 77*b*_2 by integral molding (insert molding).

The lead insertion groove 76*a* is formed between the terminal fixing part 77*a*_1 and the terminal fixing part 77*a*_2; and the lead insertion groove 76*b* is formed between the terminal fixing part 77*b*_1 and the terminal fixing part 77*b*_2. The lead insertion grooves 76*a* and 76*b* are recessed portions which recess inwards from the ends of the terminal block base part 71 in the X-axis positive direction; and the lead insertion grooves 76*a* and 76*b* extend from the upper end to the lower end of the terminal base part 71. The lead part 41*b* of the first wire 41*c* is inserted to the lead insertion groove 76*a*, and the lead part 42*b* of the second wire 42*c* is inserted to the lead insertion groove 76*b* (see FIG. 2).

The bottom fixing part 79 is formed at an end of the terminal block base part 71 in the X-axis negative direction (opposite of the side where the bobbin 20 is arranged), and the bottom fixing part 79 is formed in a step form at the bottom face of the terminal block base part 71. The bottom fixing part 79 is approximately a flat face, and has a predetermined length along the X-axis direction and also has a predetermined length in the Y-axis direction. The bottom fixing part 79 is formed from one end to the other end of the terminal block base part 71 along the Y-axis direction. An end of a cover base part 81 of the cover 80 is fixed to the bottom fixing part 79.

The terminal 61_1, the terminal 61_2, the terminal 62_1, and the terminal 62_2 are installed to the terminal block 70 by taking a predetermined space between each other in the Y-axis direction. The terminal 61_1 and the terminal 61_2 have the same shapes, and these are fixed to the terminal fixing parts 77*a*_1 and 77*a*_2. The lead part 41*a* of the first wire 41*c* is connected to the terminal 61_1, and the lead part 41*b* of the first wire 41*c* is connected to the terminal 61_2.

Also, the terminals 62_1 and 62_2 have the same shapes, and these are fixed to the terminal fixing parts 77*b*_1 and the terminal fixing part 77*b*_2. The lead part 42*a* of the second wire 42*c* is connected to the terminal 62_1, and the lead part 42*b* of the second wire 42*c* is connected to the terminal 62_2.

The terminal 61_1 includes an outside connecting part 610_1, a linking part 611_1, a wire connecting bottom part 612_1, and a wire connecting folded part 613_1. The outside connecting part 610_1 is a part which connects to the mounting substrate, and it protrudes out from the upper part of the terminal fixing part 77*a*_1 (the terminal insertion groove 770*a*_1) and extends to the upper direction. The outside connecting part 610_1 protrudes out to the upper direction than a top edge of the case 90 (see FIG. 1).

The linking part 611_1 is a part which connects the outside connecting part 610_1 and the wire connecting bottom part 612_1; and the linking part 611_1 is bent outwards in the Y-axis direction and extends to the X-axis negative direction.

The wire connecting bottom part 612_1 and the wire connecting folded part 613_1 are parts where the wire is connected, and the lead part 41*a* is held (pressure adhered) between the wire connecting bottom part 612_1 and the wire connecting folded part 613_1. The wire connecting folded part 613_1 is integrally connected to the outer end of the wire connecting bottom part 612_1 in the Y-axis direction, and the wire connecting folded part 613_1 is arranged so that it faces against the wire connecting bottom part 612_1 in the Z-axis direction. The wire connecting folded part 613_1 has a curved face but it may be formed in a flat shape.

The terminal 61_2 includes an outside connecting part 610_2, a linking part 611_2, a wire connecting bottom part 612_2, and a wire connecting folded part 613_2. The shape and the function of each part constituting the terminal 61_2 are the same as the shape and the function of each parts constituting the terminal 61_1, hence the detailed description is omitted.

The terminal 62_1 includes an outside connecting part 620_1, a linking part 621_1, a wire connecting bottom part 622_1, and a wire connecting folded part 623_1. The terminal 62_1 is basically the same as the terminal 61_1 except that the terminal 62_1 is symmetric to the terminal 61_1 with respect to the X-axis. Hence, the detailed description of the terminal 62_1 is omitted.

The terminal 62_2 includes an outside connecting part 620_2, a linking part 621_2, a wire connecting bottom part 622_2, and a wire connecting folded part 623_2. The terminal 62_2 is basically the same as the terminal 61_2 except that the terminal 62_2 is symmetric to the terminal 61_2 with respect to the X-axis. Hence, the detailed description of the terminal 62_2 is omitted.

The cover 80 includes a cover base part 81, an insulation part 82, cover side parts 83*a* and 83*b*, and a holding part 84. The cover 80 is formed separately from the terminal block 70, and the cover 80 is arranged around the terminal block 70 in a re-installable manner to the terminal block 70.

The cover base part 81 has a flat face which is approximately parallel to the XY plane, and the cover base part 81 is arranged under the terminals 61_1 and 61_2 and the terminals 62_1 and 62_2 which are installed to the terminal block 70. The tip of the cover base part 81 in the X-axis direction is fixed while engaging with the bottom fixing part 79. By fixing the cover base part 81 to the bottom fixing part 79, the position shifting of the cover 80 to the Z-axis direction against the terminal block 70 can be prevented.

The insulation part 82 is formed approximately at a center part of the cover 80 in the Y-axis direction. An insulation recessed part 820 is formed to the insulation part 82. The insulation recessed part 820 is recessed towards the lower side from the upper surface of the insulation part 82, and also recessed to the X-axis positive direction from the lateral side face of the insulation recessed part 820 in the X-axis negative direction. The terminal 61_2 is arranged to one side of the insulation part 82 in the Y-axis direction, and the terminal 62_2 is arranged to the other side of the insulation part 82 in the Y-axis direction.

By forming the insulation part 82 having the insulation recessed part 820 to the cover 80, the insulation distance can extended between the terminal 61_2 to which the lead part 41*b* of the first wire 41*c* is connected and the terminal 62_2 to which the lead part 42*b* of the second wire 42*c* is connected. Thus, these wires (the primary coil and the secondary coil) can be securely insulated.

The cover side parts 83*a* and 83*b* extend upwards, and these raise up perpendicularly from the end of the cover base part 81 in the X-axis negative direction side. The cover side part 83*a* is formed to one side of the insulation part 82 in the Y-axis direction, and the cover side part 83*b* is formed to the other side of the insulation part 82 in the Y-axis direction.

By forming the cover base part 81, the cover side part 83*a*, and the cover side part 83*b* to the cover 80, the terminals 61_1 and 61_2 and the terminals 62_1 and 62_2 which are installed to the terminal block 70 can be protected from exterior forces and the like. Also, the terminals 61_1 and 61_2 and the core 50*a* can be securely insulated due to the cover base part 81 and the cover side part 83*a* (see FIG. 3), and also the terminals 62_1 and 62_2 and the core 50*b* can be securely insulated due to the cover base part 81 and the cover side part 83*b*.

The holding part 84 is formed approximately at the center part of the cover base part 81 in the Y-axis direction, and the holding part 84 projects out towards the terminal block 70 from the position of the insulation part 82. The holding part 84 is a part for holding the cover mounting part 78 of the terminal block 70.

The holding part 84 includes an upper side arm 841 and a lower side arm 842. The upper side arm 841 is formed to an upper end of the insulation part 82, and extends towards the terminal block 70. The lower side arm 842 is formed to a lower end of the insulation part 82 (where the cover base par 81 is positioned), and it extends towards the terminal block 70 so that it is approximately parallel to the upper side arm 841. The tips of the upper side and lower side arms 841 and 842 are formed in hook shapes, and these are bent in the direction towards each other. The upper side and lower side arms 841 and 842 respectively hold the upper face and the lower face of the cover mounting part 78, thereby the holding part 84 can be installed to the cover mounting part 78.

By holding the cover mounting part 78 of the terminal block 70 using the upper side arm 841 and the lower side arm 842, the cover 80 can be installed to the cover mounting part 78 with a sufficient fixing strength without using adhesives and the like; thus, a cost reduction can be achieved, and faster production can also be achieved.

Next, a method of producing the coil device 10 is described using FIG. 3 and so on. First, each part shown in FIG. 3 is prepared. The terminals 61_1 and 61_2 and the terminals 62_1 and 62_2 are installed to the terminal block in advance using insert molding and the like. Also, the cover 80 is installed to the terminal block 70 in advance. The cover mounting part 78 of the terminal block 70 is held by the holding part 84 of the cover 80, thereby the terminal block 70 is installed to the cover 80, and there is no need to use adhesives and the like.

Next, the first wire 41*c* and the second wire 42*c* are wound around the outer circumference face of the winding part 21 of the bobbin 20. The first coil part 41 is formed to one side in the Y-axis direction than the projection parts 33 and 34, and the coil part 42 is formed to the other side in the Y-axis direction than the projection parts 33 and 34. The lead parts 41*a* and 41*b* of the first wire 41*c* are pulled out from the end at one side of the winding part 21 in the axis direction. Also, the lead parts 42*a* and 42*b* of the second wire 42*c* are pulled out from the end at the other side of the winding part 21 in the axis direction.

Next, one end of the terminal block 70 is fixed to the terminal block fixing part 23*a* of the bobbin 20, and the other end of the terminal block 70 in the Y-axis direction is fixed to the terminal block fixing part 23*b* of the bobbin 20. The terminal block 70 is arranged at a position spaced away in a predetermined distance from the outer circumference face of the winding part 21 to the outer side in the X-axis direction.

Next, the lead part 41*a* is connected to the terminal 61_1 using pressure adhering and the like; the lead part 41*b* is connected to the terminal 61_2 using pressure adhering and the like; the lead part 42*a* is connected to the terminal 62_1 using pressure adhering and the like; and the lead part 42*b* is connected to the terminal 62_2 using pressure adhering and the like (see FIG. 2). Next, the middle leg part 53*a* of the core 50*a* and the middle leg part 53*b* of the core 50*b* are inserted into the through hole 211 of the bobbin 20, thereby the cores 50*a* and 50*b* are installed to the bobbin 20.

Next, the bobbin 20 and the like are placed inside the case 90, and the case 90 is filled with the potting 100, thereby the coil device 10 shown in FIG. 1 can be obtained.

As mentioned in above, the coil device 10 according to the present embodiment has the terminal block 70 which is formed separately from the bobbin 20 as shown in FIG. 3. Thus, when the coil device 10 is produced, the first wire 41*c* and the second wire 42*c* can be wound to the outer circumference face of the winding part 21 while the terminal block 70 is disconnected from the bobbin 20. Hence, when the first wire 41*c* and the second wire 42*c* are wound using an auto-winding machine, this prevents the terminal block from interfering the auto-winding using an auto-winding machine. Also, by forming only the terminal block 70 using a high heat-resistant resin separately from the bobbin 20, the coil device 10 having a heat-resistance can be produced inexpensively.

Also, the terminal block 70 is provided at a position spaced away from the outer circumference of the winding part 21 in the X-axis direction. Thus, the terminal block 70 can be provided at the lateral side of the winding part 21 in the X-axis direction. Also, the coil device 10 can be downsized in terms of the X-axis direction and the Z-axis direction, thereby the coil device 10 can be downsized.

Also, the terminal block 70 is provided approximately parallel of the winding part 21 in the axis direction. Thus, this prevents the terminal block 70 from protruding out unnecessarily to the lateral side of the winding coil 21 in the X-axis direction, thus the size of the coil device 10 in the X-axis direction can be downsized.

Also, in the present embodiment, as shown in FIG. 8, the arms 72*a* and 72*b* are engaged to the flange engaging parts 24*a* and 24*b* using the terminal block hooks 73*a* and 73*b* (see FIG. 6), thus the terminal block 70 can be installed to the bobbin 20 with a sufficient fixing strength even without using adhesives and the like. Hence, a cost reduction can be achieved, and faster production can also be achieved. Also, the terminal block 70 can be provided by taking a distance corresponding to the lengths of the arms 72*a* and 72*b* from the outer circumference face of the winding part 21 in the X-axis direction, thus by changing the lengths of the arms 72*a* and 72*b*, the position of the terminal block 70 can be adjusted.

Also, in the present embodiment, the lead part 41*a* of the first wire 41*c* and the lead part 42*a* of the second wire 42*c* are respectively pulled out towards the terminal block 70 along the circumference of the arms 72*a* and 72*b* (see FIG. 2, FIG. 9, FIG. 10). Thus, the lead parts 41*a* and 42*a* can be pulled out in short lengths from the winding part 21 towards the terminal block 70. Thus, unnecessary drawing of the lead parts 41*a* and 42*a* (longer lengths of the lead parts 41*a* and 42*a*) can be prevented which improves the quality of coil device 10 and also contributes to decrease the electric resistance and suppressing a resonance of the first wire 41*c* and the second wire 42*c*.

Also, as shown in FIG. 6, the bobbin hooks 25*a* and 25*b* are formed to the flange engaging parts 24*a* and 24*b*, thus the lead parts 41*a* and 42*a* pulled out along the circumference of the arms 72*a* and 72*b* can be prevented from position shifting towards the upper ends of the flange engaging parts 24*a* and 24*b*.

Also, in the present embodiment, as shown in FIG. 1, heat generated in the bobbin 20 and so on can be dissipated out via the case 90 and the potting resin 100, thus the coil device 10 can be cooled efficiently. Also, as shown in FIG. 6, the through holes 35*a* and 35*b* and the through holes 36*a* and 36*b* are formed on the bobbin 20, thus the potting resin 100 can flow in and out of the bobbin 20 via these through holes. Thereby, the case 90 can be fully filled with the potting resin 100.

Second Embodiment

A coil device 110 according to the second embodiment of the present disclosure basically have the same configuration and the same effects as the aforementioned-first embodiment, except for the below described points. The same reference number is given to each part which is the same as the first embodiment, and the overlapping section is omitted from explaining.

Figure 11:
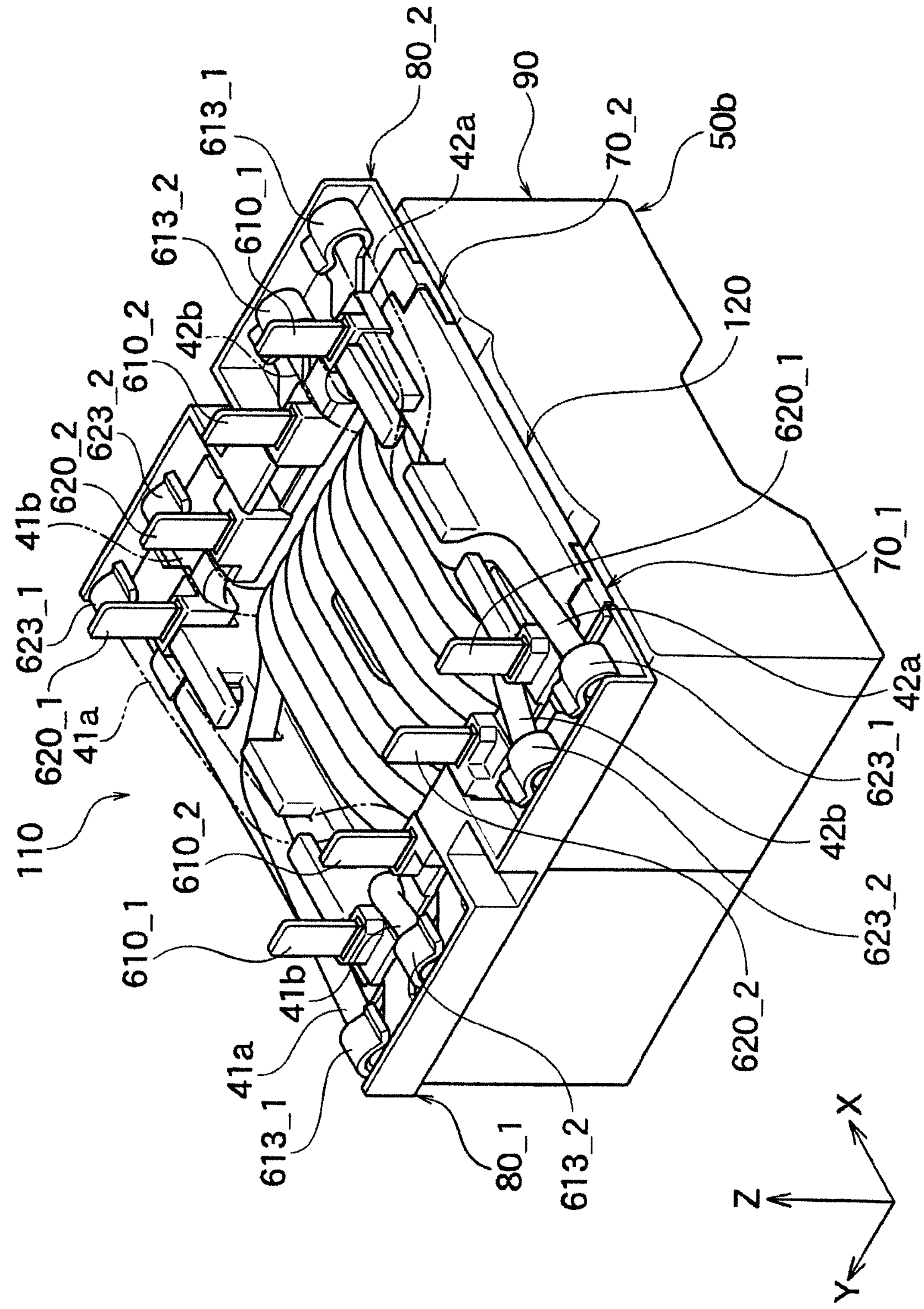
FIG. 11 is a perspective view of a coil device according to a second embodiment of the present disclosure.

As shown in FIG. 11, a coil device 110 includes terminal blocks 70_1 and 70_2, covers 80_1 and 80_2. That is, the coil device 110 of the present embodiment has the terminal block 70_1 and the cover 80_1 at a position spaced away from the outer circumference face of the winding part 21 to the X-axis negative direction, which is the same as the coil device 10 according to the first embodiment. The terminal block 70_2 and the cover 80_2 are provided at a position spaced away from the outer circumference face of the winding part 21 to the X-axis positive direction, which differs from the coil device 10 according to the first embodiment.

Figure 12:
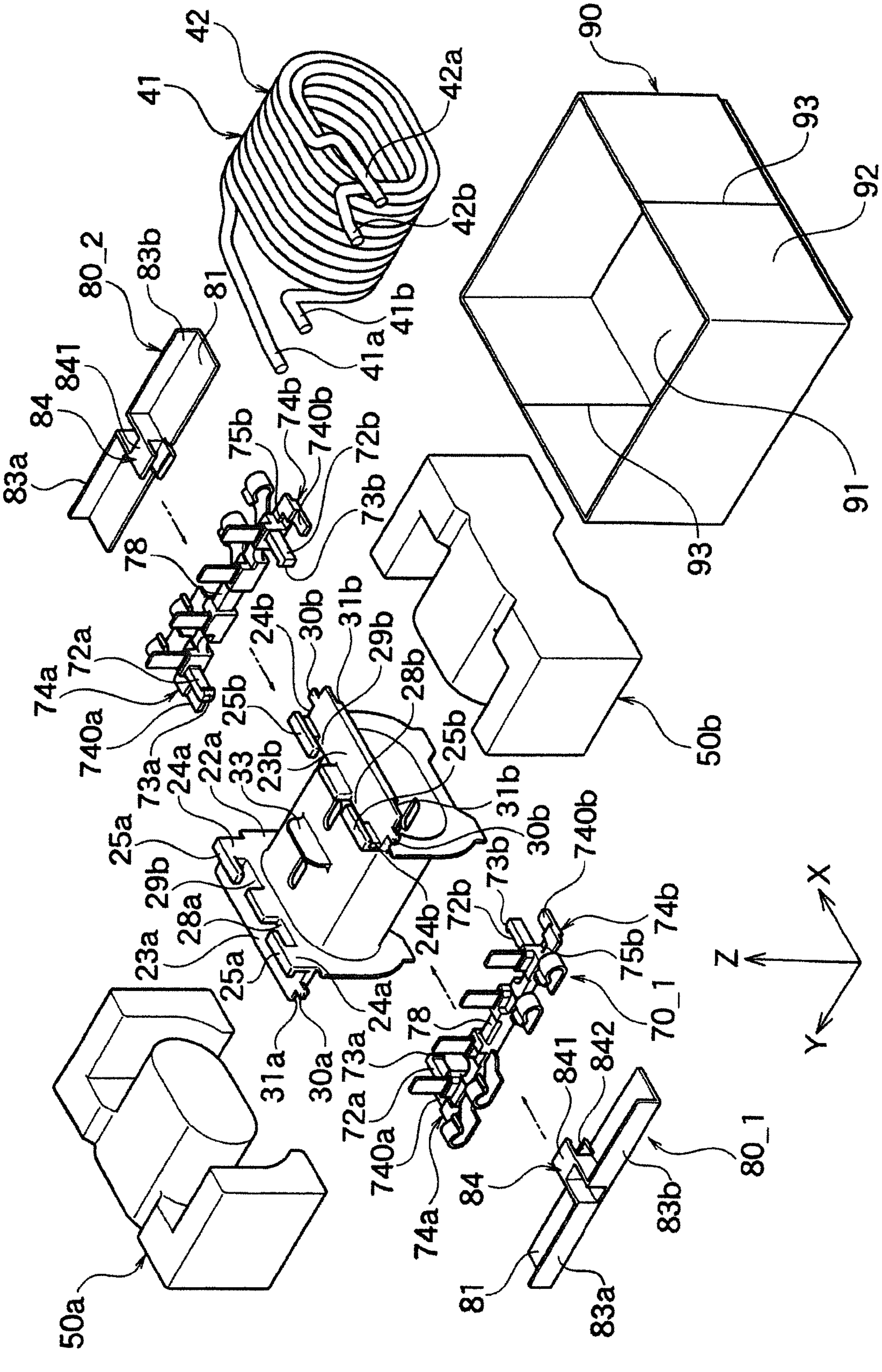
FIG. 12 is an exploded perspective view of the coil device shown in FIG. 11.

As shown in FIG. 12, at terminal block fixing parts 23*a* and 23*b* of a winding part 21, flange engaging parts 24*a* and 24*b*, bobbin raised parts 30*a* and 30*b*, and bobbin step parts 31*a* and 31*b* are formed to an end of the bobbin 120 in the X-axis positive direction in addition to an end of the bobbin 120 in the X-axis negative direction. Therefore, the shape at one side of the bobbin 120 in the X-axis direction and the shape at the other side in the X-axis direction of the bobbin 120 are the same (the shapes are symmetrical) across the center area of the bobbin 120 in the X-axis direction.

In the present embodiment, the same effect as the first embodiment can be attained as well. Moreover, in the present embodiment, the terminal blocks 70_1 and 70_2 are formed to the both lateral sides of the winding part 21 in the X-axis direction, and a lead part 41*a* and/or 41*b* of the first wire 41*c* can be pulled out and fixed to the side where the terminal block 70_2 is provided instead of the side where the terminal block 70_1 is provided. Also, the lead parts 42*a* and/or 42*b* of the second wire 42*c* can be pulled out and fixed to the side where terminal block 70_2 is provided instead of the side where the terminal block 70_1 is provided. Also, for example, when four wires are wound to the outer circumference face of the winding part 21, a lead part of each wire can be connected to respective terminal of eight terminals.

Note that, the present disclosure is not limited to the above-mentioned embodiments, and it can be variously modified within the scope of the invention.

In the above-mentioned embodiments, the example of using the present disclosure to a transformer is described, however the present disclosure can be used to other kinds of coil device as well.

In the present embodiment, the cores 50*a* and 50*b* are constituted in E-shape, however either one of the cores 50*a* and 50*b* may be an E-shaped core and the other one may be an I-shaped core. Alternatively, both cores 50*a* and 50*b* may be U-shaped cores. Further alternatively, either one of the cores 50*a* and 50*b* may be a U-shaped core, and the other one may be an I-shaped core. Furthermore alternatively, the core 50*a* may be a combination of two U-shaped cores, and the core 50*b* may be a combination of two U-shaped cores.

In the present embodiment, the plurality of through holes (specifically, four through holes, which are through holes 35*a*, 35*b*, 36*a*, and 36*b*) are formed on the outer circumference face of the winding part 21, however the number of through hole may be one. For example, one through hole may be formed on either one of the upper or lower portion of the outer circumference face of the winding part 21. Also, the number of the through hole may be 2 to 3, or may be 5 or more.

In the above-mentioned first embodiment, the lead part 41*a* may pass through the notch 28*a* shown in FIG. 2. Also, among the lead parts 41*a* and 41*b*, the lead part 41*b* may pass through the notch 28*a* or the notch 29*a*.

Similarly, the lead part 42*a* may pass through the notch 29*b*. Also, among the lead parts 42*a* and 42*b*, the lead part 42*b* may pass through the notch 28*b* or the notch 29*b*.

In the above-mentioned embodiments, the projection parts 33 and 34 are formed approximately at the center of the winding part 21 in the Y-axis direction. However, the positions of the projection parts 33 and 34 may be shifted towards one or the other side in the Y-axis direction.

In the above-mentioned embodiments, two projection parts (the projection parts 33 and 34) are formed to the winding part 21, however the number of projection parts may be one or may be three or more.

In the above-mentioned embodiments, two coil parts (the first coil part 41 and the second coil part 42) are formed, however the number of coil parts may be three or more.

NUMERICAL REFERENCES

10,110 . . . Coil device
20,120 . . . Bobbin
21 . . . Winding part
211 . . . Through hole
22*a*,22*b* . . . Flange
220*a*,220*b* . . . Flange main part
23*a*,23*b* . . . Terminal block fixing part
230*a*,230*b* . . . Fixing main part
24*a*,24*b* . . . Flange engaging part
25*a*,25*b* . . . Bobbin hook
26*a*,26*b* . . . Partition
27*a*,27*b* . . . Extended flange part
28*a*,28*b*,29*a*,29*b* . . . Notch
30*a*,30*b* . . . Bobbin raised part
31*a*,31*b* . . . Bobbin step part
310*a*,310*b* . . . Lower step face
32*a*,32*b* . . . Mounting part
33,34 . . . Projection part
35*a*,35*b*,36*a*,36*b* . . . Through hole
37*a*,37*b* . . . Recessed base part
41 . . . First coil part
42 . . . Second coil part
41*a*,41*b* . . . First lead part
41*c* . . . First wire
42*a*,42*b* . . . Second lead part
42*c* . . . Second wire
43 . . . Contacting area
44,45 . . . Non-contacting area
50*a*,50*b* . . . Core
51*a*,51*b* . . . Base part
510*a*,510*b* . . . Outer face
511*a*,511*b* . . . Inner face
512*a*,512*b* . . . Upper face
513*a*,513*b* . . . Lower face

52_a_,52_b_ . . . Outer leg part
520_a_,520_b_ . . . Outer leg inner surface
53_a_,53_b_ . . . Middle leg
54_a_,54_b_ . . . Upper side recessed part
540_a_,540_b_ . . . Upper side bottom face
541_a_,541_b_ . . . Upper side taper face
55_a_,55_b_ . . . Lower side recessed part
550_a_,550_b_ . . . Lower side bottom face
551_a_,551_b_ . . . Lower side taper face
56_a_,56_b_ . . . Thicker portion
61_1,61_2,62_1,62_2 . . . Terminal
610_1,610_2,620_1,620_2 . . . Outside connecting part
611_1,611_2,621_1,621_2 . . . Linking part
612_1,612_2,622_1,622_2 . . . Wire connecting bottom part
613_1,613_2,623_1,623_2 . . . Wire connecting folded part
70,70_1,70_2 . . . Terminal block
71 . . . Terminal block base part
72_a_,72_b_ . . . Arm
73_a_,73_b_ . . . Terminal block hook
74_a_,74_b_ . . . Terminal block step part
740_a_,740_b_ . . . Step lower face
75_a_,75_b_ . . . Terminal block recessed part
76_a_,76_b_ . . . Lead insertion groove
77_a__1,77_a__2,77_b__1,77_b__2 . . . Terminal block fixing part
770_a__1,770_a__2,770_b__1,770_b__2 . . . Terminal insertion groove
78 . . . Cover mounting part
79 . . . Bottom fixing part
80,80_1,80_2 . . . Cover
81 . . . Cover base part
82 . . . Insulation part
820 . . . Insulation recessed part
83_a_,83_b_ . . . Cover side part
84 . . . Holding part
841 . . . Upper side arm
842 . . . Lower side arm
90 . . . Case
91 . . . Case base part
92 . . . Case side part
93 . . . Connecting part
100 . . . Resin

What is claimed is:

1. A coil device comprising:

a bobbin including a winding part wound with a wire around an outer circumference face of the winding part, and a flange formed at an end of the winding part in an axis direction; and a terminal block formed separately from the bobbin and installed to the bobbin; in which the terminal block is installed to the bobbin at a position spaced away from the outer circumference face of the winding part in a direction perpendicular to the axis direction of the winding part, wherein the end comprises ends, the terminal block is connected to one of the ends in the axis direction of the winding part and also connected to another one of the ends in the axis direction of the winding part.

2. The coil device according to claim 1, wherein the terminal block comprises an arm having a first hook part formed in a hook shape and protruding out towards the bobbin; and the flange comprises a flange engaging part which extends in a direction approximately perpendicular to the arm and engages with the first hook part.

3. The coil device according to claim 2, wherein a second hook part having a hook shape is formed at a tip of the flange engaging part, and a lead part of the wire is pulled out towards the terminal block along a circumference of the arm while the first hook part is engaged with the flange engaging part.

4. The coil device according to claim 1, wherein a terminal block fixing part fixing the terminal block is formed at an end of the bobbin in an axis direction, in which the terminal block fixing part comprises a raised part which protrudes out towards the terminal block, and the terminal block comprises a recessed part which engages with the raised part.

5. The coil device according to claim 1, wherein the flange is formed along a circumference direction of the winding part, and the flange has a notch where a lead part of the wire can pass through.

6. The coil device according to claim 5, wherein the lead part comprises lead parts, and one of the lead parts of the wire is pulled out through the notch towards the terminal block from an outer side of the flange, and another one of the lead parts of the wire is pulled out towards the terminal block from an inner side of the flange without passing through the notch.

7. The coil device according to claim 1 further comprising a cover provided around the terminal block; wherein the wire comprises wires;

the terminal block is provided with a plurality of terminals connected with lead parts of the wires respectively;

the terminals are arranged in the axis direction of the winding part; and the cover comprises, a holding part to hold the terminal block, a base part arranged under the terminals, and a side part standing up from a side edge of the base part.

8. The coil device according to claim 1, wherein the axis direction of the winding part is approximately parallel to a mounting surface.

9. The coil device according to claim 1 further comprising a case housing the bobbin, wherein the case is capable of being filled with a potting resin, and at least one through hole is formed on an outer circumference face of the winding part.

10. A coil device comprising:

a bobbin including a winding part wound with a wire around an outer circumference face of the winding part, and a flange formed at an end of the winding part in an axis direction; and a terminal block formed separately from the bobbin and installed to the bobbin; in which the terminal block is installed to the bobbin at a position spaced away from the outer circumference face of the winding part in a direction perpendicular to the axis direction of the winding part, wherein the terminal block comprises an arm having a first hook part formed in a hook shape at a tip of the arm and protruding out towards the bobbin; and the flange comprises a flange engaging part which extends in a direction approximately perpendicular to the arm and engages with the first hook part.

11. The coil device according to claim 10, wherein a second hook part having a hook shape is formed at a tip of the flange engaging part, and a lead part of the wire is pulled out towards the terminal block along a circumference of the arm while the first hook part is engaged with the flange engaging part.

12. The coil device according to claim 10, wherein a terminal block fixing part fixing the terminal block is formed at an end of the bobbin in an axis direction, in which the terminal block fixing part comprises a raised part which protrudes out towards the terminal block, and the terminal block comprises a recessed part which engages with the raised part.

13. The coil device according to claim 10, wherein the flange is formed along a circumference direction of the winding part, and the flange has a notch where a lead part of the wire can pass through.

14. The coil device according to claim 10 further comprising a case housing the bobbin, wherein the case is capable of being filled with a potting resin, and at least one through hole is formed on an outer circumference face of the winding part.

15. A coil device comprising:

a bobbin including a winding part wound with a wire around an outer circumference face of the winding part, and a flange formed at an end of the winding part in an axis direction; and a terminal block formed separately from the bobbin and installed to the bobbin; in which the terminal block is installed to the bobbin at a position spaced away from the outer circumference face of the winding part in a direction perpendicular to the axis direction of the winding part, wherein a terminal block fixing part fixed with the terminal block is formed at an end of the bobbin in an axis direction, in which the terminal block fixing part comprises a first step part, the terminal block comprises a second step part, and the first step part and the second step part engage with each other while a first step lower face of the first step part and a second step lower face of the second step part are in contact.

16. The coil device according to claim 15, wherein a terminal block fixing part fixing the terminal block is formed at an end of the bobbin in an axis direction, in which the terminal block fixing part comprises a raised part which protrudes out towards the terminal block, and the terminal block comprises a recessed part which engages with the raised part.

17. The coil device according to claim 15, wherein the flange is formed along a circumference direction of the winding part, and the flange has a notch where a lead part of the wire can pass through.

18. The coil device according to claim 15 further comprising a case housing the bobbin, wherein the case is capable of being filled with a potting resin, and at least one through hole is formed on an outer circumference face of the winding part.

* * * * *